US012754688B2

(12) United States Patent
Zhou et al.

(10) Patent No.: US 12,754,688 B2
(45) Date of Patent: Oct. 6, 2026

(54) DATA PROCESSING METHOD AND APPARATUS, AND STORAGE SYSTEM

(71) Applicant: Hygon Information Technology Co., Ltd., Tianjin (CN)

(72) Inventors: Peng Zhou, Tianjin (CN); Sam Xie, Tianjin (CN); Yuxuan Wang, Tianjin (CN)

(73) Assignee: Hygon Information Technology Co., Ltd., Tianjin (CN)

( * ) Notice: Subject to any disclaimer, the term of this patent is extended or adjusted under 35 U.S.C. 154(b) by 156 days.

(21) Appl. No.: 18/697,754

(22) PCT Filed: Mar. 6, 2023

(86) PCT No.: PCT/CN2023/079785
§ 371 (c)(1),
(2) Date: Apr. 2, 2024

(87) PCT Pub. No.: WO2024/148669
PCT Pub. Date: Jul. 18, 2024

(65) Prior Publication Data

US 2025/0238160 A1 Jul. 24, 2025

(30) Foreign Application Priority Data

Jan. 9, 2023 (CN) ......................... 202310037736.5

(51) Int. Cl.
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC .... G06F 3/0655; G06F 3/0604; G06F 3/0673; G06F 11/1048; G06F 11/1012;
(Continued)

(56) References Cited

U.S. PATENT DOCUMENTS 6,038,680 A * 3/2000 Olarig ................. G06F 11/1044
714/E11.041
2016/0299812 A1* 10/2016 Olbrich ............... G06F 12/0246
(Continued)

FOREIGN PATENT DOCUMENTS

| | | | |
|---|---|---|---|
| CN | 111294059 | A | 6/2020 |
| CN | 111858142 | A | 10/2020 |
| KR | 1020190128284 | A | 11/2019 |

OTHER PUBLICATIONS

Office Action from Korean Intellectual Property Office for Application No. 10-2024-7014387, dated Feb. 12, 2026.

*Primary Examiner* — Albert Decady
*Assistant Examiner* — Osman M Alshack
(74) *Attorney, Agent, or Firm* — Fox Rothschild LLP

(57) ABSTRACT

The disclosure provides a data processing method and apparatus, and a storage system. The data processing method includes reading two sets of burst data from a first storage channel and reading two sets of burst data from a second storage channel to obtain four sets of burst data; organizing the four sets of burst data into a group of error correcting codewords, the group of error correcting codewords includes k read-back data symbols and m read-back check symbols; and performing a decoding operation based on the group of error correcting codewords to obtain an error-corrected symbol.

16 Claims, 7 Drawing Sheets

100

(58) Field of Classification Search
CPC ... G06F 11/1016; G11C 7/1018; G11C 29/42; G11C 2029/0411; G11C 29/00; H03M 13/1575; H03M 13/27
USPC .................................................. 714/758, 781
See application file for complete search history.

(56) References Cited

U.S. PATENT DOCUMENTS

| | | | | |
|---|---|---|---|---|
| 2017/0004095 | A1* | 1/2017 | Takeda | G06F 3/0685 |
| 2017/0293523 | A1* | 10/2017 | Lunadier | G11C 29/52 |
| 2019/0034271 | A1* | 1/2019 | Zhang | G06F 11/1048 |
| 2019/0102246 | A1* | 4/2019 | Criss | G06F 11/1044 |
| 2019/0146870 | A1* | 5/2019 | Cha | H03M 13/2906 714/755 |
| 2019/0179795 | A1* | 6/2019 | Huang | G06N 3/08 |
| 2019/0324854 | A1* | 10/2019 | Park | G06F 11/1076 |
| 2020/0295783 | A1* | 9/2020 | Berman | H03M 13/1174 |
| 2022/0014213 | A1* | 1/2022 | Lu | H03M 13/29 |
| 2022/0199184 | A1* | 6/2022 | Muchherla | G11C 29/52 |
| 2022/0383916 | A1* | 12/2022 | Park | G11C 7/1018 |

* cited by examiner

400

$$\begin{pmatrix} a^0 & 0 & 0 & 0 & 0 & 0 & 0 & 0 \\ 0 & a^0 & 0 & 0 & 0 & 0 & 0 & 0 \\ 0 & 0 & a^0 & 0 & 0 & 0 & 0 & 0 \\ 0 & 0 & 0 & a^0 & 0 & 0 & 0 & 0 \\ 0 & 0 & 0 & 0 & a^0 & 0 & 0 & 0 \\ 0 & 0 & 0 & 0 & 0 & a^0 & 0 & 0 \\ 0 & 0 & 0 & 0 & 0 & 0 & a^0 & 0 \\ 0 & 0 & 0 & 0 & 0 & 0 & 0 & a^0 \\ a^0 & a^0 & a^0 & a^0 & a^0 & a^0 & a^0 & a^0 \\ a^0 & a^1 & a^2 & a^3 & a^4 & a^5 & a^6 & a^7 \\ a^0 & a^2 & a^4 & a^6 & a^8 & a^{10} & a^{12} & a^{14} \\ a^0 & a^3 & a^6 & a^9 & a^{12} & a^{15} & a^{18} & a^{21} \end{pmatrix} * \begin{pmatrix} d0 \\ d1 \\ d2 \\ d3 \\ d4 \\ d5 \\ d6 \\ d7 \end{pmatrix} = \begin{pmatrix} d0 \\ d1 \\ d2 \\ d3 \\ d4 \\ d5 \\ d6 \\ d7 \\ c0 \\ c1 \\ c2 \\ c3 \end{pmatrix}$$

FIG. 4

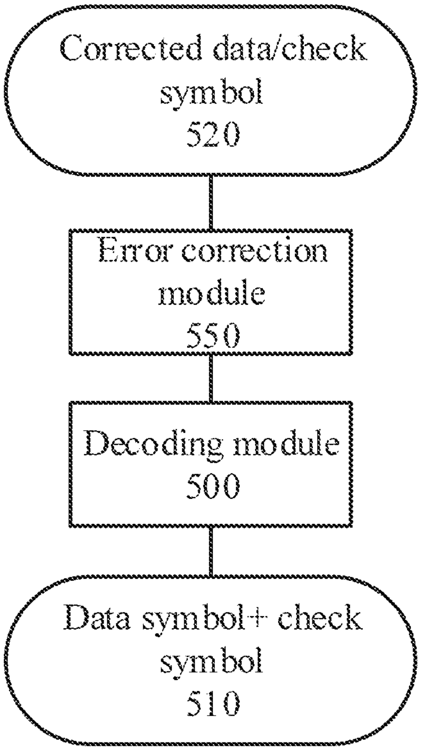

FIG. 5

600

$$\begin{pmatrix} \alpha^0 & \alpha^0 & \alpha^0 & \alpha^0 & \alpha^0 & \alpha^0 & \alpha^0 & \alpha^0 & \alpha^0 & 0 & 0 & 0 \\ \alpha^0 & \alpha^1 & \alpha^2 & \alpha^3 & \alpha^4 & \alpha^5 & \alpha^6 & \alpha^7 & 0 & \alpha^0 & 0 & 0 \\ \alpha^0 & \alpha^2 & \alpha^4 & \alpha^6 & \alpha^8 & \alpha^{10} & \alpha^{12} & \alpha^{14} & 0 & 0 & \alpha^0 & 0 \\ \alpha^0 & \alpha^3 & \alpha^6 & \alpha^9 & \alpha^{12} & \alpha^{15} & \alpha^{18} & \alpha^{21} & 0 & 0 & 0 & \alpha^0 \end{pmatrix} * \begin{pmatrix} d0 \\ d1 \\ d2 \\ d3 \\ d4 \\ d5 \\ d6 \\ d7 \\ c0 \\ c1 \\ c2 \\ c3 \end{pmatrix} = \begin{pmatrix} 0 \\ 0 \\ 0 \\ 0 \end{pmatrix}$$

FIG. 6

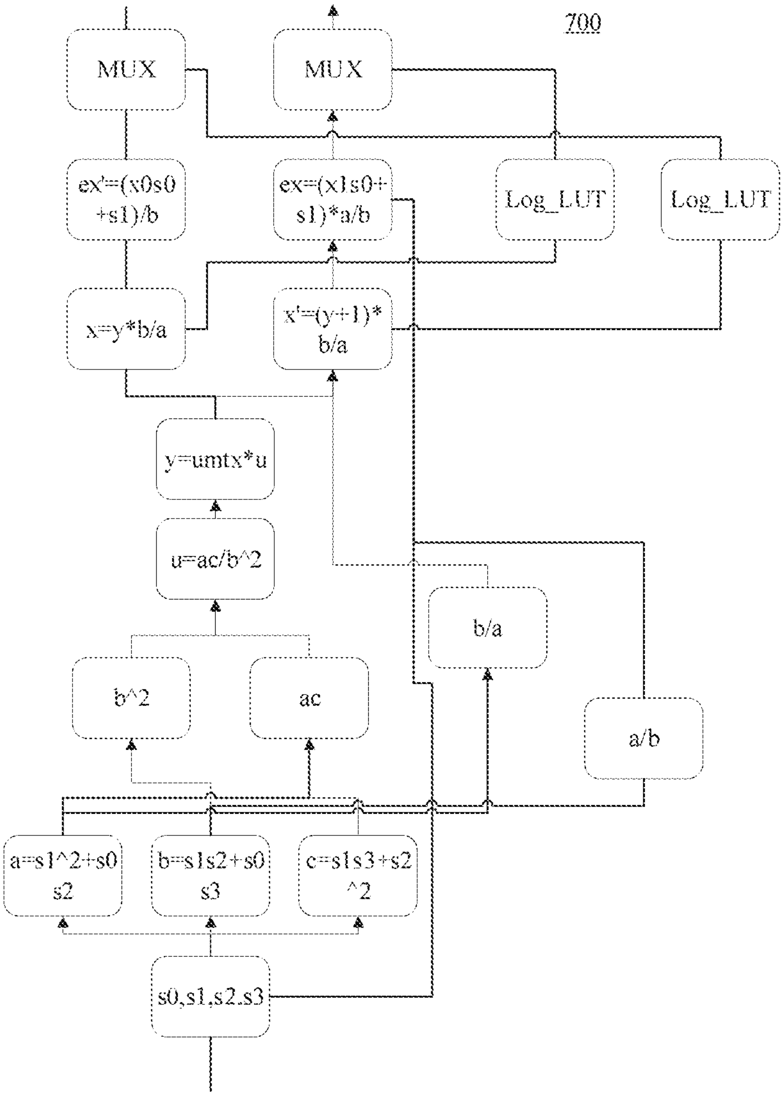

FIG. 7

DATA PROCESSING METHOD AND APPARATUS, AND STORAGE SYSTEM

CROSS-REFERENCE TO RELATED APPLICATION

The present application claims priority to International Patent Application No. PCT/CN2023/079785, filed Mar. 6, 2023, which claims priority to Chinese Patent Application No. 202310037736.5, filed on Jan. 9, 2023, the disclosures of which are incorporated herein by reference in [its] entirety as part of the present application.

TECHNICAL FIELD

The embodiments of the present disclosure relate to a data processing method and apparatus, and a storage system.

BACKGROUND

Data is easily interfered by factors such as the environment during the transmission, communication and storage process, thereby causing a data error. For example, a double data rate (DDR) memory (e.g., DDR SDRAM or DDR memory) is inevitably interfered by environmental factors such as electromagnetics and the like during the working process, thereby causing a memory error. For users with a high stability requirement, the memory error may cause a fatal problem. For example, for a server, that has a high requirement on DDR data reliability, DDR memory error correction technology can improve the stability and error correction capability of the server memory, such as the memory stick that supports error correcting codes (ECC), which can improve the stability and error correction capability of the server memory.

For some DDR memory, when a correctable error (CE) occurs, the memory DIMM, does not need to be replaced as soon as the error occurs. However, once an uncorrectable error (UE) occurs, for example, currently, if there are two simultaneous errors in memory device, the uncorrectable error is reported. In this case, data is generally lost and cannot be recovered. The loss of data affects the execution of corresponding operations by processors or other computation units, causing the related functions or applications to fail to operate normally, or even causing downtime.

SUMMARY

The present disclosure provides a data processing method and apparatus, a storage system, an electronic apparatus and a storage medium to implement a simultaneous error correction of two symbols.

At least one embodiment of the present disclosure provides a data processing method, comprising: reading two sets of burst data from a first storage channel and reading two sets of burst data from a second storage channel to obtain four sets of burst data, wherein the four sets of burst data correspond to encoded data stored in the first storage channel and the second storage channel, the encoded data is obtained by encoding k data symbols that are written into the first storage channel and the second storage channel, and the encoded data comprises the k data symbols and m check symbols, wherein a total bit width of the m check symbols is eight times a bit width of one error correcting symbol; organizing the four sets of burst data into a group of error correcting codewords, wherein the group of error correcting codewords comprises k read-back data symbols and m read-back check symbols; and performing a decoding operation based on the group of error correcting codewords to obtain an error-corrected symbol.

For example, according to the processing method of at least one of the embodiments of the present disclosure, organizing the four sets of burst data into the group of error correcting codewords, comprises: combining burst data, corresponding to a same memory device, in the two sets of burst data that are read from the first storage channel into one error correcting codeword symbol to obtain a first-part error correcting codeword; combining burst data, corresponding to a same memory device, in the two sets of burst data that are read from the second storage channel into one error correcting codeword symbol to obtain a second-part error correcting codeword; and combining the first-part error correcting codeword and the second-part error correcting codeword.

For example, according to the processing method of at least one of the embodiments of the present disclosure, encoding the k data symbols that are written into the first storage channel and the second storage channel, comprises: encoding the k data symbols based on an encoding matrix; and performing the decoding operation based on the group of error correcting codewords to obtain the error-corrected symbol comprises: decoding the group of error correcting codewords based on a decoding matrix to obtain syndrome; and utilizing the syndrome to obtain the error-corrected symbol, wherein the encoding matrix is a matrix of at least (k+m) rows and at least k columns and comprises a Vandermonde-like matrix, and the decoding matrix is a matrix of at least m rows and at least (k+m) columns and comprises the Vandermonde-like matrix, wherein the Vandermonde-like matrix is a matrix associated with a Vandermonde matrix, wherein $k \le p^n - 1$, $m \le p^n$, n is a number of bits per symbol, and p is a capacity of a single bit.

For example, according to the processing method of at least one of the embodiments of the present disclosure, the encoding matrix comprises a first interval and a second interval, wherein the first interval comprises an identity matrix of k rows and k columns, and the second interval comprises a Vandermonde-like matrix of m rows and k columns; and encoding the k data symbols based on the encoding matrix to obtain the encoded data comprises: multiplying the k data symbols by the identity matrix of k rows and k columns to obtain the k data symbols; and multiplying the k data symbols by the Vandermonde-like matrix of m rows and k columns to obtain the m check symbols.

For example, according to the processing method of at least one of the embodiments of the present disclosure, the decoding matrix comprises a third interval and a fourth interval, wherein the third interval comprises a Vandermonde-like matrix of m rows and k columns, and the fourth interval comprises an identity matrix of m rows and m columns; and decoding the group of error correcting codewords based on the decoding matrix to obtain the syndrome comprises: multiplying the k read-back data symbols and the m read-back check symbols by the decoding matrix to obtain the syndrome.

For example, according to the processing method of at least one of the embodiments of the present disclosure, utilizing the syndrome to obtain the error-corrected symbol, comprises: reading the syndrome; outputting, in response to all the syndrome being “0”, the k read-back data symbols as the error-corrected symbol, wherein all the syndrome being “0” indicates that the k read-back data symbols and the m read-back check symbols are correct; outputting, in response to the syndrome having a single "1", the k read-back data symbols as the error-corrected symbol, wherein the syndrome having a single "1" indicates that the k read-back data symbols are correct and a read-back check symbol, corresponding to the single "1" of the syndrome, in the m read-back check symbols is erroneous; and utilizing, in response to the syndrome having v "1"s, the syndrome to perform an error correction on an error symbol in the k read-back data symbols and the m read-back check symbols to obtain the error-corrected symbol, wherein the syndrome having v "1"s indicates that v1 read-back data symbols, corresponding to "1" of the syndrome, in the k read-back data symbols have an error, and v2 read-back check symbols, corresponding to "1" of the syndrome, in the m read-back check symbols have an error, wherein v≥2, v1≤m, v2≤m, and v1+v2=v.

For example, according to the processing method of at least one of the embodiments of the present disclosure, utilizing the syndrome to perform the error correction on the error symbol in the k read-back data symbols and the m read-back check symbols to obtain the error-corrected symbol, comprises: utilizing the syndrome to determine an error position and an error value of the error symbol in the k read-back data symbols and the m read-back check symbols; and utilizing the error position to perform the error correction on the error symbol to obtain the error-corrected symbol.

For example, according to the processing method of at least one of the embodiments of the present disclosure, utilizing the syndrome to determine the error position and the error value of the error symbol in the k read-back data symbols and the m read-back check symbols, comprises;

1) performing a dual data symbol error correction operation, comprising:
   utilizing the syndrome to construct a multi-degree equation; and
   solving the error position and the error value based on the multi-degree equation;
2) performing an error correction operation of a single data symbol and a single check symbol, comprising:
   on an assumption that a value of the single check symbol is erroneous, solving the error position and the error value, based on a ratio relationship between the syndrome being equal to a ratio relationship between elements of a Vandermonde-like matrix corresponding to the syndrome; and
3) performing a single-data symbol error correction operation, comprising:
   solving the error position and the error value, based on the ratio relationship between the syndrome being equal to the ratio relationship between the elements of the Vandermonde-like matrix corresponding to the syndrome.

For example, according to the processing method of at least one of the embodiments of the present disclosure, wherein the multi-degree equation is a quadratic equation, p=2, m=4, and the syndrome is (s0, s1, s2, s3), wherein utilizing the syndrome to construct the multi-degree equation, comprises:

constructing a quadratic equation $ax^2+bx+c=0$, wherein $$a = s_1^2 + s_0 s_2,$$

$$b = s_1 s_2 + s_0 s_3, \text{ and}$$

-continued $$c = s_1 s_3 + s_2^2,$$

wherein solving the error position and the error value based on the multi-degree equation, comprises:

in response to a not being 0, making $$y = \frac{ax}{b} \text{ and } u = \frac{ac}{b^2}$$

to transform the quadratic equation into:

$$y^2 + y + u = 0;$$

obtaining two roots y and y' of $y^2+y+u=0$; making $$x = \log\left(y * \frac{b}{a}\right) \text{ and } x' = \log\left(y' * \frac{b}{a}\right)$$

to obtain error positions x and x'; and utilizing the error positions and the syndrome to calculate error values $e_x$ and $e_{x'}$, wherein:

$$e_x = \frac{s_0 2^{x'} + s_1}{2^x + 2^{x'}},$$

$$e_{x'} = s_0 + e_x,$$

wherein on the assumption that the value of the single check symbol is erroneous, solving the error position and the error value, based on the ratio relationship between the syndrome being equal to the ratio relationship between the elements of the Vandermonde-like matrix corresponding to the syndrome, comprises:

on an assumption of a value of a check memory device ecc0 corresponding to s0 being erroneous, calculating, based on $$\frac{s3}{s2} = \frac{s2}{s1} = 2^x,$$

that the error positions are x and the respectively; check memory device ecc0, respectively, and the error values are $$\frac{s1}{2^x} \text{ and } \frac{s1}{2^x} \oplus s0,$$

respectively;

on an assumption of a value of a check memory device ecc1 corresponding to s1 being erroneous, calculating, based on $$\frac{s3}{s2} = 2^x \text{ and } \frac{s2}{s0} = 2^{2x},$$

that the error positions are x and the check memory device ecc1, respectively, and the error values are s0 and $s0*2^x \oplus s1$, respectively;

on an assumption of a value of a check memory device ecc2 corresponding to s2 being erroneous, calculating, based on $$\frac{s1}{s0} = 2^x \text{ and } \frac{s3}{s1} = 2^{2x},$$

that the error positions are x and the check memory device ecc2, respectively, and the error values are s0 and $s1*2^x \oplus s2$, respectively;

on an assumption of a value of a check memory device ecc3 corresponding to s3 being erroneous, calculating, based on $$\frac{s1}{s0} = \frac{s2}{s1} = 2^x,$$

that the error positions are x and the check memory device ecc3, respectively, and the error values are s0 and $s2*2^x \oplus s3$, respectively;

wherein solving the error position and the error value, based on the ratio relationship between the syndrome being equal to the ratio relationship between the elements of the Vandermonde-like matrix corresponding to the syndrome, comprises:

calculating, based on $$\frac{s3}{s2} = \frac{s2}{s1} = \frac{s1}{s0} = 2^x,$$

that the error position is x, and the error value is s0.

For example, according to the processing method of at least one of the embodiments of the present disclosure, obtaining the two roots y and y' of $y^2+y+u=0$, comprises: solving $y^2+y+u=0$ through a mathematical operation to obtain the two roots y and y' of $y^2+y+u=0$; or obtaining the two roots y and y' of $y^2+y+u=0$ through a lookup table.

For example, according to the processing method of at least one of the embodiments of the present disclosure, solving $y^2+y+u=0$ through the mathematical operation to obtain the two roots y and y' of $y^2+y+u=0$, comprises: solving $y^2+y+u=0$ by performing an exclusive OR (xor) operation on u to obtain the two roots y and y' of $y^2+y+u=0$.

For example, according to the processing method of at least one of the embodiments of the present disclosure, y and u are both 8-bit finite field numbers, wherein solving $y^2+y+u=0$ by performing the xor operation on u, comprises:

Y0=not Y0', or Y0' xor 1,
Y1=Y1',
Y2=Y2',
Y3=Y3',
Y4=Y4',
Y5=Y5',
Y6=Y6',
Y7=Y7',
Y7=U0 xor U1 xor U2 xor U4,
Y6=U0 xor U1 xor U2 xor U4 xor U7,
Y5=U1 xor U2 xor U3 xor U4 xor U6,
Y4=U0 xor U7,
Y3=U1 xor U2 xor U3 xor U4,
Y2-U0 xor U3 xor U4 xor U6,
Y1=U0 xor U2 xor U4,
Y0=U3 xor U6,
U5=Tr(u), and wherein U0 to U7 respectively indicate a 0th bit to a 7th bit of u;

Y0 to Y7 respectively indicate a 0th bit to a 7th bit of y;

Y0' to Y7' respectively indicate a 0th bit to a 7th bit of y'; and

Tr(u) indicates whether $y^2+y+u=0$ has a solution, wherein Tr(u)=1 indicates no solution, and Tr(u)=0 indicates that a solution exists.

For example, according to the processing method of at least one of the embodiments of the present disclosure, the Vandermonde-like matrix comprises a Vandermonde matrix, a left-right flip of a Vandermonde matrix, an up-down flip of a Vandermonde matrix, or a transposition of a Vandermonde matrix.

At least one of the embodiments of the present disclosure provides a processing apparatus, comprising: a reading module, configured to read two sets of burst data from a first storage channel and reading two sets of burst data from a second storage channel to obtain four sets of burst data, wherein the four sets of burst data correspond to encoded data stored in the first storage channel and the second storage channel, the encoded data is obtained by encoding k data symbols that are written into the first storage channel and the second storage channel, and the encoded data comprises the k data symbols and m check symbols, wherein a total bit width of the m check symbols is eight times a bit width of one error correcting symbol; and organize the four sets of burst data into a group of error correcting codewords, wherein the group of error correcting codewords comprises k read-back data symbols and m read-back check symbols; and a decoding module, configured to: perform a decoding operation based on the group of error correcting codewords to obtain an error-corrected symbol.

At least one of the embodiments of the present disclosure provides a storage system, comprising the processing apparatus described above; and a storage unit.

At least one of the embodiments of the present disclosure provides an electronic apparatus, comprising: a processor; and a memory, on which instructions are stored, wherein the instructions, when executed by the processor, cause the processor to execute the data processing method described above.

At least one of the embodiments of the present disclosure provides a computer-readable storage medium, on which instructions are stored, wherein the instructions, when executed by a processor, cause the processor to execute the data processing method described above.

According to at least one of the embodiments of the present disclosure, a simultaneous error correction of two symbols can be implemented.

BRIEF DESCRIPTION OF THE DRAWINGS

In order to illustrate the technical solutions of the embodiments of the present disclosure more clearly, the drawings of the embodiments of the present disclosure are briefly introduced below. Obviously, the drawings in the following description only relate to some embodiments of the present disclosure, rather than limiting the present disclosure.

FIG. 4 illustrates a schematic diagram of an encoding operation according to at least one embodiment of the present disclosure;

FIG. 5 illustrates a schematic diagram of a decoding module and an error correction module according to at least one embodiment of the present disclosure;

FIG. 6 illustrates a schematic diagram of a decoding operation according to at least one embodiment of the present disclosure;

FIG. 7 illustrates a schematic diagram of a dual data symbol error correction operation according to at least one embodiment of the present disclosure;

DETAILED DESCRIPTION

Figure 1:
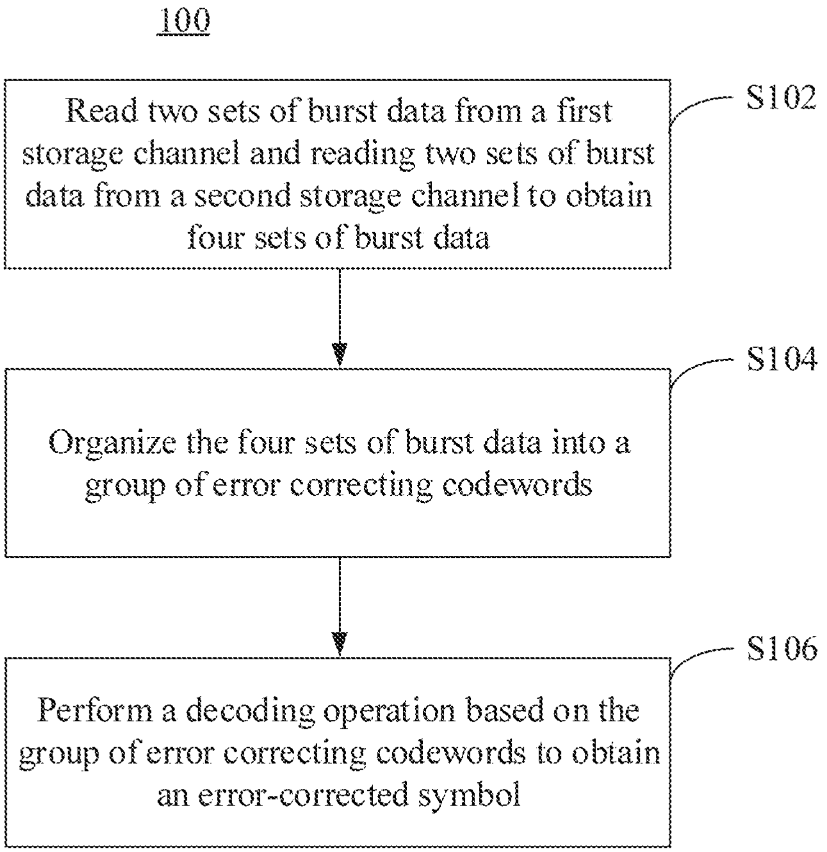
FIG. 1 illustrates a flowchart of a data processing method according to at least one embodiment of the present disclosure.

Referring to the specific embodiments of the present disclosure in detail, the examples of the present disclosure are illustrated in the drawings. Although the present disclosure is described with reference to the specific embodiments, it is understood that the present disclosure is not intended to be limited to the described embodiments. On the contrary, the alterations, modifications, and equivalents that are included in the spirit and scope of the present disclosure as defined by the appended claims are intended to be covered. It should be noted that all the method operations described in the present disclosure can be implemented by any functional blocks or functional arrangements, and any functional blocks or functional arrangements can be implemented as physical entities or logical entities, or a combination of the physical entities and logical entities.

In order to enable those skilled in the art to understand the present disclosure better, the present disclosure is further described in detail below with reference to the drawings and the specific embodiments.

It is noted that the examples to be introduced next are only the specific examples, and are not intended to limit the embodiments of the present disclosure to be the specific appearance, hardware, connection relationship, operation, value, condition, data, sequence, and the like that are illustrated and described. By reading the specification, those skilled in the art can use the concept of the present disclosure to construct more embodiments that are not mentioned in the present disclosure.

Terms used in the present disclosure are those general terms currently widely used in the art in consideration of functions about the present disclosure, but the terms may be changed according to the intention of those of ordinary skill in the art, precedents, or new technologies in the art. In addition, the specific terms may be selected by the applicant, and in this case, the detailed meanings of the specific terms are described in the detailed description of the present disclosure. Therefore, the terms used in the specification should not be understood as simple names, but based on the meanings of the terms and the general description of the present disclosure.

The present disclosure uses a flowchart schematic diagram to illustrate the operations executed by the system according to the embodiments of the present disclosure. It should be understood that the preceding or following operations are not necessarily executed in an exact order. Conversely, various steps may be processed in a reverse order or simultaneously according to the requirement. At the same time, other operations may be added to these procedures, or a certain step or steps may be removed from these procedures.

Firstly, the abbreviations and related terms involved in the present disclosure are defined and illustrated.

Double-Symbol Correction (DSC): a technology that can correct two symbols simultaneously.

DDR: a double data rate.

DDR SDRAM: double data rate synchronous dynamic random access memory, which is commonly called as DDR.

ECC (Error Check Correction): error correcting code or error correcting coding is a technology that can implement "error checking and correcting", and can improve the stability and reliability of computer operation.

RS (Reed-Solomon) coding: also known as Reed-Solomon code (e.g., Reed-Solomon code), RS is a forward error correction channel coding, which is valid for the polynomials generated by correcting the oversampled data. RS code is a special non-binary BCH code with strong error correction capability.

SDDC (Single Device Data Correction): correct the data on one device

DDDC (Double Device Data Correction): correct the data on two devices

Memory channel (Channel): each memory controller may have a plurality of memory channels, which are the data transmission paths between the memory and the memory controller on the processor (such as CPU). For example, the common memory channels include memory channel 0 and memory channel 1.

UE: is an uncorrectable error.

CE: is a correctable error.

Data Device: is a memory device that stores data.

ECC Device: is a memory device that stores check bits.

Symbol: is also known as a code element, the smallest unit in ECC error correction. Generally, for the devices of x4 and x8, the corresponding symbols can be 4-bit data and 8-bit data respectively.

Finite field: is also known as Galois field, is a field including only a finite number of elements, for example, it can be written as $GF(2^n)$, and n indicates a number of bits of the elements in the field.

Vandermonde matrix: is a matrix whose columns are geometric progressions. An exemplary Vandermonde matrix could be:

$$\begin{bmatrix} 1 & 1 & \cdots & 1 \\ 1 & 2 & \cdots & n \\ 1 & 4 & \cdots & n^2 \\ \vdots & \vdots & \vdots & \vdots \\ 1 & 2^{m-1} & \cdots & n^{m-1} \end{bmatrix}.$$

It can be understood that the terms defined above are only exemplary definitions in specific application scenarios, so as to understand the present disclosure better. For example, the exemplary definition described above for a specific memory can be extended to other types of memory or other storage.

For storage (such as DDR memory), at present, in response to two memory devices simultaneously having an error, the present system reports an uncorrectable error, which cannot be corrected back. After re-reading, the error is still an uncorrectable error, and the data is lost. In a severe case, the system will cause system downtime. When hardware is used to record the information such as the previous position of the correctable error, etc., and algorithm post-processing to achieve the purpose of correcting the two memory devices one by one, which can also solve part of the problem that two memory devices simultaneously have an error. However, a series of preconditions are required, and the coverage rate is low. One of the two memory devices that simultaneously has an error must be reported by a previous correctable error.

An exemplary mainstream method for correcting two errors is DDDC, which mainly includes the following points:

the lockstep is required to be open;

algorithmically, ECC uses Parity and CRC;

only one memory device can be corrected in one algorithmic operation;

when the second memory device is required to be corrected, the previous faulty memory device must be replaced and written into the spare device, and then the algorithm is used to find the second faulty memory device;

the errors of two memory devices can only be time-shared corrected. In response to two memory devices simultaneously having an error, the DDDC technology is useless, and the system reports an uncorrectable error.

At least one embodiment of the present disclosure proposes a data processing method and apparatus, a storage system, an electronic apparatus, and a storage medium. For example, when two symbols (e.g., two memory devices of DDR4 and DDR5) have an error at any time, without software participating, and without relying on historical record information, the errors of the symbols (e.g., two memory devices of DDR4 and DDR5) can be corrected simultaneously. Thus, the reliability of the memory is greatly improved, and the risk of data loss and system downtime is reduced. Referring to the drawings, the data processing method and apparatus, storage system, electronic apparatus, and storage medium of the embodiments of the present disclosure are described in detail below.

Firstly, a data processing method of the embodiments of the present disclosure is introduced below. The data processing method can be applied to the processing apparatus, storage systems, electronic apparatus, and other suitable software or hardware, or the combination of software and hardware that are described below.

FIG. 1 illustrates a flowchart schematic diagram of a data processing method 100 according to at least one embodiment of the present disclosure. The processing method may include steps S102-S106.

In step S102, reading two sets of burst data from a first storage channel and reading two sets of burst data from a second storage channel to obtain four sets of burst data, wherein the four sets of burst data correspond to encoded data stored in the first storage channel and the second storage channel, the encoded data is obtained by encoding k data symbols that are written into the first storage channel and the second storage channel, and the encoded data comprises the k data symbols and m check symbols, wherein a total bit width of the m check symbols is eight times a bit width of one error correcting symbol.

In some embodiments, k, and m respectively corresponds to the total quantity of data memory devices of the first and second storage channels and the total quantity of check memory devices of the first and second storage channels. The bit width of each data symbol of the k data symbols is twice of the bit width of the corresponding data memory device, and the bit width of each check symbol of the m check symbols is twice of the bit width of the corresponding check memory device, where k and m are positive integers. For example, in the exemplary DDR4 or DDR5, the first storage channel and the second storage channel both include 8 data memory devices of x4 and 2 check memory devices (ecc devices) of x4. Therefore, the bit width of an error correcting symbol is 4 bits, which corresponds to the smallest unit of error correction, k=16, m=4, the bit widths of each data memory device and each check memory device are x4 (4 bits), and the bit widths of each data symbol and each check symbol are x8. Therefore, the total bit width of the m check symbols of encoded data is 4*8=32 bits, and the bit width of the error correcting symbol is 4 bits. Of course, the embodiments are not limited thereto, and the bit widths of the data memory device and the check memory device may be changed. For example, two data memory devices (or check memory devices) of x4 can be denoted as a data memory device (or check memory device) of x8, at this time, k and m may still correspond to the bit width of x4, e.g., the bit width of an error correcting symbol.

In some embodiments, the data symbol may be decoded and corrected (if necessary) in a check operation to obtain data or an instruction for executing a computation to implement a predetermined function. The check symbol can provide information during decoding and error correction (if necessary) to ensure to obtain the correct data.

The exemplary first storage channel and second storage channel may be two memory channels, such as channel 0 and channel 1 in a memory controller for DDR4 or DDR5.

In step S104, organizing the four sets of burst data into a group of error correcting codewords, wherein the group of error correcting codewords comprises k read-back data symbols and m read-back check symbols.

In some embodiments, the four sets of burst data (also referred to as read-back encoded data in the present disclosure, which is essentially encoded data read from the first storage channel and the second storage channel) correspond to the encoded data, so as to obtain corresponding correct data. However, the encoded data may be interfered with by environmental factors such as electromagnetics during transmission or in a storage unit (including the first storage channel and the second storage channel), resulting in a data error. Therefore, k read-back data symbols (e.g., the data symbols that are read back from the first memory channel and the second memory channel) and m read-back check symbols (e.g., the check symbols that are read back from the first memory channel and the second memory channel) may be different from the k data symbols and m check symbols included in the encoded data.

In some embodiments, the storage unit may be the memory itself, such as a DDR memory or DDR memory. In other embodiments, the storage unit may be a storage array in a memory.

In step S106, performing a decoding operation based on the group of error correcting codewords to obtain an error-corrected symbol. Thus, according to the data processing method 100 of at least one embodiment of the present disclosure, a simultaneous error correction of two symbols or symbols (e.g., error correcting symbols) is implemented by respectively reading two sets of burst data from two storage channels. For example, when two error symbols are located in two different memory devices, the error correction of two memory devices can be implemented. For another example, when two error symbols are located in the same memory device, the error correction of a single memory device can be implemented.

For example, in a DDR memory, the data bit width of the DDR is generally determined. For example, a DDR4 is 72+8 (data bit width+check bit width), a DDR5 is 32+8 (data bit width+check bit width), and thus, the error correction of the symbol of x8-bit can be implemented. For example, when an x4 in the symbol of x8 appears in a device (e.g., a device of x4 or x8), and the other x4 appears in another device (e.g., a device of x4 or x8), the error correction of the two devices can be implemented. For another example, when the symbol of x8 appears in one device (e.g., a device of x8), the error correction of one device can be implemented.

Other aspects of the data processing method of at least one embodiment of the present disclosure are described in detail below.

In some embodiments, as an alternative or supplement to the processing method described above with reference to FIG. 1, at least one embodiment of the present disclosure further provides an encoding method, which includes: encoding the k data symbols that are written into a first and second storage channels to obtain encoded data. The encoded data includes k data symbols and m check symbols, wherein the total bit width of the m check symbols is eight times a bit width of an error correcting symbol. Thus, the encoded data corresponds to the four sets of burst data described above, so as to promote a group of error correcting codewords including k read-back data symbols and m read-back check symbols, thereby promoting the decoding described above to implement the error correction of two symbols.

In some embodiments, according to the processing method of at least one embodiment of the present disclosure, organizing the four sets of burst data into the group of error correcting codewords may include: combining burst data, corresponding to a same memory device, in the two sets of burst data that are read from the first storage channel into one error correcting codeword symbol to obtain a first-part error correcting codeword; combining burst data, corresponding to a same memory device, in the two sets of burst data that are read from the second storage channel into one error correcting codeword symbol to obtain a second-part error correcting codeword; and combining the first-part error correcting codeword and the second-part error correcting codeword. Thus, according to the processing method of at least one embodiment of the present disclosure, the organization of a group of error correcting codewords can be implemented by combining the two sets of burst data that are read from each storage channel. However, the embodiments are not limited thereto. By combining the burst data corresponding to the same data memory device in each storage channel into a data symbol, and combining the burst data corresponding to the same check memory device in each storage channel into a check symbol, the data symbol and check symbol of each storage channel are obtained, thereby combining these data symbols and check symbols to implement an organization of a group of error correcting codewords.

In some embodiments, according to the processing method of at least one embodiment of the present disclosure, encoding the k data symbols that are written into the first storage channel and the second storage channel may include: encoding the k data symbols based on an encoding matrix; and performing the decoding operation based on the group of error correcting codewords to obtain the error-corrected symbol may include: decoding the group of error correcting codewords based on a decoding matrix to obtain syndrome; and utilizing the syndrome to obtain the error-corrected symbol, wherein the encoding matrix is a matrix of at least (k+m) rows and at least k columns and may include a Vandermonde-like matrix, and the decoding matrix is a matrix of at least m rows and at least (k+m) columns and may include the Vandermonde-like matrix, wherein the Vandermonde-like matrix is a matrix associated with a Vandermonde matrix, wherein $k \le p^n - 1$, $m \le p^n$, n is a number of bits per symbol, and p is a capacity of a single bit.

In some embodiments, based on the syndrome, for example, the positions of an error data symbol and an error check symbol (also referred to as an error symbol position or an error symbol position) and the error values can be determined. Moreover, the error symbol can be corrected based on the syndrome to obtain the error-corrected symbols, such as the error-corrected data symbols or the error-corrected check symbols.

At least one embodiment of the present disclosure may be implemented under a finite field, wherein $k \le p^n - 1$, $m \le p^n$, n is the number of bits per symbol, and p is a capacity of a single bit, so p and n can form a finite field $GF(p^n)$.

It can be understood that the capacity of a single bit refers to the amount of data indicated by a single bit, e.g., p-ary. In some embodiments, p may be 2 (e.g., a single bit may indicate binary data (0, 1)). Therefore, for $GF(2^n)$, $k \le 2^n - 1$, and $m \le 2^n$. In other embodiments, p maybe 3 or other values (e.g., in quantum computation, a single bit may indicate 3 (or more) ary data). Here, k, m and n may be positive integers, and p may be a prime number.

In some embodiments, a Vandermonde-like matrix includes a Vandermonde matrix and variants of the Vandermonde matrix. For example, a Vandermonde-like matrix includes a Vandermonde matrix, a left-right flip of a Vandermonde matrix, an up-down flip of a Vandermonde matrix, or a transposition of a Vandermonde matrix, or other variants in which elements in a Vandermonde matrix are transposed. An exemplary Vandermonde matrix may be:

$$\begin{bmatrix} 1 & 1 & \cdots & 1 \\ 1 & 2 & \cdots & n \\ 1 & 4 & \cdots & n^2 \\ \vdots & \vdots & \vdots & \vdots \\ 1 & 2^{m-1} & \cdots & n^{m-1} \end{bmatrix}.$$

Table 1 illustrates a contrast table of the data processing method according to at least one embodiment of the present disclosure and the number of symbols of the RS code.

TABLE 1 a contrast table of the data processing method of the present disclosure and the number of symbols of the RS code.

| | RS code | The data processing method of the present disclosure |
|---|---|---|
| Principle | Remainder after division of polynomial | Store points on a high-dimensional curve |
| Bit/symbol | n | n |
| The range of k and m | $k + m \leq 2^n - 1$ | $k \leq 2^n - 1$, $m \leq 2^n$ |

Referring to Table 1, for $GF(2^n)$, a number of the data symbols and a number of the check symbols in the RS code are required to satisfy $k+m \leq 2^n-1$. In contrast, for $GF(2^n)$, based on the Vandermonde-like matrix, the data processing method of the present disclosure can make a number of the data symbol satisfy $k \leq 2^n-1$, and make the number of the check symbol satisfy $m \leq 2^n$. For example, in response to n=4, k=11 and m=4 may be used for the RS code, and k=15 and m=4 may be used for the data processing method of the present disclosure. In this case, the data processing method of the present disclosure can support more check symbols and data symbols (e.g., k=15 of the data processing method of the present disclosure vs k=11 of the RS code), and is easy to expand because the values of k and m in the data processing method of the present disclosure are more flexible (e.g., k can be 15, 14, 13, 12, 11, etc.).

Therefore, the data processing method according to at least one embodiment of the present disclosure, on the basis of the Vandermonde-like matrix and compared with the RS code, can support more check symbols and data symbols, which improves the code rate, so as to improve the error correction capability and expand easily. However, the embodiment is not limited thereto, and the above encoding and decoding may also be implemented by other methods.

In some embodiments, according to the data processing method of at least one of the embodiments of the present disclosure, the encoding matrix may include a first interval and a second interval, wherein the first interval may include an identity matrix of k rows and k columns, and the second interval may include a Vandermonde-like matrix of m rows and k columns; and encoding the k data symbols based on the encoding matrix to obtain the encoded data may include: multiplying the k data symbols by the identity matrix of k rows and k columns to obtain the k data symbols; and multiplying the k data symbols by the Vandermonde-like matrix of m rows and k columns to obtain the m check symbols. Thus, according to the processing method of at least one embodiment of the present disclosure, a variety of encoding matrices can be formed, which improves the flexibility of the formed encoding matrix. It is understood that the encoding matrix may additionally include other intervals, and 0 or 1 or other appropriate values may be set in other intervals without affecting the implementation of the above encoding.

In some embodiments, according to the processing method of at least one embodiment of the present disclosure, the identity matrix of k rows and k columns in the first interval may be distributed in any (k+m) rows of the encoding matrix; the Vandermonde-like matrix of m rows and k columns in the second interval may be distributed in any (k+m) rows of the encoding matrix; and the positions of the first interval and the second interval have no intersection. Thus, according to the processing method of at least one embodiment of the present disclosure, each row of the identity matrix and the Vandermonde-like matrix can be distributed in the encoding matrix flexibly.

In some embodiments, according to the processing method of at least one embodiment of the present disclosure, the identity matrix of k rows and k columns in the first interval may be distributed in the first k rows of the encoding matrix; and the Vandermonde-like matrix of m rows and k columns in the second interval may be distributed in the (k+1)th to (k+m)th rows of the encoding matrix. Thus, the encoding matrix formed according to the processing method of at least one embodiment of the present disclosure has a simple structure. Of course, the embodiment is not limited thereto, and the positions of the identity matrix and the Vandermonde-like matrix in this embodiment may be reversed, thus, the formed structure of the encoding matrix is also simple.

In some embodiments, according to the processing method of at least one embodiment of the present disclosure, the decoding matrix may include a third interval and a fourth interval, wherein the third interval may include a Vandermonde-like matrix of m rows and k columns, and the fourth interval may include an identity matrix of m rows and m columns; and decoding the group of error correcting codewords based on the decoding matrix to obtain the syndrome may include: multiplying the k read-back data symbols and the m read-back check symbols by the decoding matrix to obtain the syndrome. Thus, according to the processing method of at least one embodiment of the present disclosure, a variety of decoding matrices can be formed, which improves the flexibility of the formed decoding matrix. It can be understood that the decoding matrix may additionally include other intervals, and 0 or 1, or other appropriate values may be set in other intervals without affecting the implementation of the above decoding.

In some embodiments, according to the processing method of at least one embodiment of the present disclosure, the Vandermonde-like matrix of m rows and k columns in the third interval may be distributed in any (k+m) columns of the decoding matrix; the identity matrix of m rows and m columns in the fourth interval may be distributed in any (k+m) columns of the decoding matrix; and the positions of the third interval and the fourth interval have no intersection. Thus, according to the processing method of at least one embodiment of the present disclosure, each row of the identity matrix and the Vandermonde-like matrix can be distributed in the decoding matrix flexibly.

In some embodiments, according to the processing method of at least one embodiment of the present disclosure, the Vandermonde-like matrix of m rows and k columns in the third interval may be distributed in the first k columns of the encoding matrix; the identity matrix of m rows and m columns in the fourth interval may be distributed in the (k+1)th to (k+m)th columns of the encoding matrix. Thus, the decoding matrix formed by the processing method according to at least one embodiment of the present disclosure has a simple structure. Of course, the embodiment is not limited thereto, and the positions of the identity matrix and the Vandermonde-like matrix in this embodiment can be reversed, and the thus structure of the formed decoding matrix is also simple.

In some embodiments, according to the processing method of at least one embodiment of the present disclosure, utilizing the syndrome to obtain the error-corrected symbol may include: reading the syndrome; outputting, in response to all the syndrome being "0", the k read-back data symbols as the error-corrected symbol, wherein all the syndrome being "0" indicates that the k read-back data symbols and the m read-back check symbols are correct; outputting, in response to the syndrome having a single "1", the k read-back data symbols as the error-corrected symbol, wherein the syndrome having a single "1" indicates that the k read-back data symbols are correct and a read-back check symbol, corresponding to the single "1" of the syndrome, in the m read-back check symbols is erroneous; and utilizing, in response to the syndrome having v "1"s, the syndrome to perform an error correction on an error symbol in the k read-back data symbols and the m read-back check symbols to obtain the error-corrected symbol, wherein the syndrome having v "1"s indicates that v1 read-back data symbols, corresponding to "1" of the syndrome, in the k read-back data symbols have an error, and v2 read-back check symbols, corresponding to "1" of the syndrome, in the m read-back check symbols have an error, wherein v≥2, v1≤m, v2≤m, and v1+v2=v. Thus, the processing method according to at least one embodiment of the present disclosure can determine whether the read-back data symbol and the read-back check symbol have an error and determine the error positions based on the obtained syndrome.

In some embodiments, according to the processing method of at least one embodiment of the present disclosure, utilizing the syndrome to perform the error correction on the error symbol in the k read-back data symbols and the m read-back check symbols to obtain the error-corrected symbol may include: utilizing the syndrome to determine an error position and an error value of the error symbol in the k read-back data symbols and the m read-back check symbols; and utilizing the error position to perform the error correction on the error symbol to obtain the error-corrected symbol. Thus, the processing method according to at least one embodiment of the present disclosure can correct the error symbols in the read-back data symbols and the read-back check symbols based on the obtained syndrome.

In some embodiments, according to the processing method of at least one embodiment of the present disclosure, utilizing the syndrome to determine the error position and the error value of the error symbol in the k read-back data symbols and the m read-back check symbols, may include:

1) performing a dual data symbol error correction operation, comprising: utilizing the syndrome to construct a multi-degree equation; and solving the error position and the error value based on the multi-degree equation;
2) performing an error correction operation of a single data symbol and a single check symbol, comprising: on an assumption that a value of the single check symbol is erroneous, solving the error position and the error value, based on a ratio relationship between the syndrome being equal to a ratio relationship between elements of a Vandermonde-like matrix corresponding to the syndrome; and
3) performing a single-data symbol error correction operation, comprising:

solving the error position and the error value, based on the ratio relationship between the syndrome being equal to the ratio relationship between the elements of the Vandermonde-like matrix corresponding to the syndrome.

The syndrome may include information, that indicates that the error is an error of a dual data symbol, an error of a single data symbol and a single check symbol, or an error of a single data symbol, and the error position and the error value can be obtained through operations corresponding to these errors (e.g., the above operation 1) to 3)). For example, when the error is an error of a dual data symbol, the error position and the error value can be obtained through the above operation 1), and at this time, the above operations 2) and 3) may have no solution. For another example, when the error is an error of a single data symbol and a single check symbol, the error position and the error value can be obtained through the above operation 2), and at this time, the above operations 1) and 3) may have no solution. For another example, when the error is an error of a single data symbol, the error position and the error value can be obtained through the above operation 3), and at this time, the above operations 1) and 2) may have no solution.

In the above embodiment, in order to utilize the syndrome to determine the error position and the error value of the error symbol in the k read-back data symbols and the m read-back check symbols, the above operations 1) to 3) can be performed simultaneously to cover, for example, possible correctable errors and uncorrectable errors (e.g., two error symbols), which provides the applicability of the processing method of at least one of the embodiments of the present disclosure in various error scenarios, such as the correctable error scenario and the uncorrectable error scenario. However, it can be understood that the embodiment is not limited thereto, and only the part of the above operations 1) to 3) may be performed. For example, in a specific error scenario, such as an error scenario where correctable errors occur frequently, only the above operation 3) may be performed.

Thus, the processing method according to at least one embodiment of the present disclosure can implement the construction of a multi-degree equation based on the Vandermonde-like matrix, and can implement the rapid determination of the error position and the error value of the error symbol. In some embodiments, the multi-degree equation may be a quadratic equation. However, the embodiment is not limited thereto, and other equations (such as cubic equations, etc.) or a combination of different types of equations (such as a combination of quadratic equations and cubic equations, etc.) may be constructed by utilizing the syndrome. Additionally, in addition to equations, the syndrome can be used through other methods (e.g., lookup tables, etc.) to solve the error position and the error value.

In some embodiments, according to the processing method of at least one embodiment of the present disclosure, the multi-degree equation may be a quadratic equation, p=2, m=4, and the syndrome may be (s0, s1, s2, s3).

wherein the utilizing the syndrome to construct the multi-degree equation, may include:

constructing a quadratic equation $ax^2+bx+c=0$, wherein, $$a = s_1^2 + s_0 s_2,$$

$$b = s_1 s_2 + s_0 s_3, \text{ and}$$

$$c = s_1 s_3 + s_2^2,$$

wherein solving the error position and the error value based on the multi-degree equations, may include:

in response to a not being 0, making $$y = \frac{ax}{b} \text{ and } u = \frac{ac}{b^2}$$

to transform the quadratic equation into:

$$y^2 + y + u = 0;$$

obtaining two roots y and y' of $y^2+y+u=0$;

making $$x = \log\left(y * \frac{b}{a}\right)$$

and $$x' = \log\left(y' * \frac{b}{a}\right)$$

to obtain error positions x and x'; and utilizing the error positions and the syndrome to calculate the error values $e_x$ and $e_{x'}$ wherein:

$$e_x = \frac{s_0 2^{x'} + s_1}{2^x + 2x'},$$

and $$e_{x'} = s_0 + e_x;$$

wherein on the assumption that the value of the single check symbol is erroneous, solving the error position and the error value, based on the ratio relationship between the syndrome being equal to the ratio relationship between the elements of the Vandermonde-like matrix corresponding to the syndrome, may include:

on an assumption of a value of a check memory device ecc0 corresponding to s0 being erroneous, calculating, based on $$\frac{s3}{s2} = \frac{s2}{s1} = 2^x,$$

that the error positions are x and the check memory device ecc0, respectively, and the error values are $$\frac{s1}{2^x}$$

and $$\frac{s1}{2^x} \oplus s0,$$

respectively;

on an assumption of a value of a check memory device ecc1 corresponding to s1 being erroneous, calculating, based on $$\frac{s3}{s2} = 2^x$$

and $$\frac{s2}{s0} = 2^{2x},$$

that the error positions are x and the check memory device ecc1, respectively, and the error values are s0 and $s*2^n \oplus s1$, respectively;

on an assumption of a value of a check memory device ecc2 corresponding to s2 being erroneous, calculating, based on $$\frac{s1}{s0} = 2^x$$

and $$\frac{s3}{s1} = 2^{2x},$$

that the error positions are x and the check memory device ecc2, respectively, and the error values are s0 and $s1*2^n \oplus s2$, respectively;

on an assumption of a value of a check memory device ecc3 corresponding to s3 being erroneous, calculating, based on $$\frac{s1}{s0} = \frac{s2}{s1} = 2^x,$$

that the error positions are x and the check memory device ecc3, respectively, and the error values are s0 and $s2*2^n \oplus s3$, respectively;

wherein solving the error position and the error value, based on the ratio relationship between the syndrome being equal to the ratio relationship between the elements of the Vandermonde-like matrix corresponding to the syndrome, may include:

calculating, based on $$\frac{s3}{s2} = \frac{s2}{s1} = \frac{s1}{s0} = 2^x,$$

that the error position is x, and the error value is s0.

Thus, according to the processing method of at least one embodiment of the present disclosure, the simultaneous error correction of two symbol positions can be implemented through 4 check symbols by constructing a quadratic equation under the finite field $GF(2^n)$. In contrast, the error correction method based on the RS code cannot implement the construction of the above quadratic equation, because the possibility of solving for two error positions does not exist, and thus the simultaneous error correction of two symbol positions cannot be implemented.

It can be understood that the above embodiment is not limited thereto, and the error correction of two symbol positions or the error correction of another number of symbol positions can be implemented by the check symbols of other finite fields and other numbers of check symbols. For example, when m=3, the error correction of 2 adjacent symbol positions (e.g., the first symbol position is j, then the second symbol position is j+1) can be implemented, because only three equations are required to obtain the 2 adjacent symbol positions and 2 corresponding error values. In addition, the error correction of the two symbol positions can be implemented by other types of equations (e.g., a cubic equation, a combination of a quadratic equation and a cubic equation, etc.) or other solving methods (e.g., lookup tables, etc.).

In some embodiments, according to the processing method of at least one embodiment of the present disclosure, obtaining the two roots y and y' of $y^2+y+u=0$ may include: solving $y^2+y+u=0$ through a mathematical operation to obtain the two roots y and y' of $y^2+y+u=0$; or obtaining the two roots y and y' of $y^2+y+u=0$ through a lookup table. Thus, the processing method according to at least one embodiment of the present disclosure can provide a flexible method to solve the two roots y and y' of $y^2+y+u=0$, thereby facilitating the determination of the error position and the error value. For example, a lookup table may pre-store u and y and y', and may obtain the corresponding y and y' based on u. The rapid determination of y and y' can be implemented on the basis of the lookup table, which is helpful to improve the speed of determining the error position and the error value.

In some embodiments, according to the processing method of at least one embodiment of the present disclosure, solving $y^2+y+u=0$ through the mathematical operation to obtain the two roots y and y' of $y^2+y+u=0$, may include: solving $y^2+y+u=0$ by performing an exclusive OR (xor) operation on u to obtain the two roots y and y' of $y^2+y+u=0$. Thus, according to the processing method of at least one embodiment of the present disclosure, y and y' can be obtained through an exclusive OR operation. However, the embodiment is not limited thereto, and y and y' can also be obtained through other logic operations.

In some embodiments, according to the processing method of at least one embodiment of the present disclosure, both of y and u may be 8-bit finite field numbers, wherein solving $y^2+y+u=0$ by performing the xor operation on u, may include:

Y0=not Y0', or Y0' xor 1,
Y1=Y1',
Y2=Y2',
Y3=Y3',
Y4=Y4',
Y5=Y5',
Y6=Y6',
Y7=Y7',
Y7=U0 xor U1 xor U2 xor U4,
Y6=U0 xor U1 xor U2 xor U4 xor U7,
Y5=U1 xor U2 xor U3 xor U4 xor U6,
Y4=U0 xor U7,
Y3-U1 xor U2 xor U3 xor U4,
Y2=U0 xor U3 xor U4 xor U6,
Y1=U0 xor U2 xor U4,
Y0=U3 xor U6, and
U5=Tr(u), wherein U0 to U7 respectively indicate a 0th bit to a 7th bit of u;

Y0 to Y7 respectively indicate a 0th bit to a 7th bit of y;

Y0' to Y7' respectively indicate a 0th bit to a 7th bit of y'; and

Tr(u) indicates whether $y^2+y+u=0$ has a solution, wherein Tr(u)=1 indicates no solution, and Tr(u)=0 indicates that a solution exists.

Thus, according to the processing method of at least one embodiment of the present disclosure, for 8-bit finite field numbers, two roots y and y' can be obtained based on the above specific logic operations. However, the embodiment is not limited thereto, and for other numbers of bits, the two roots y and y' can also be obtained based on other logic operations.

In some embodiments, the processing method according to at least one embodiment of the present disclosure further includes: in response to a single 1 in the syndrome, utilizing the syndrome to perform an error correction on the m read-back check symbols. Thus, the processing method according to at least one embodiment of the present disclosure can perform an error correction on the error check symbols in the read-back check symbols.

In some embodiments, according to the processing method of at least one embodiment of the present disclosure, utilizing the syndrome to obtain the error-corrected symbols may be similar to utilizing the syndrome to obtain the error-corrected symbols in the related technology of the error correction method on the basis of the RS code.

Corresponding to the data processing method according to at least one embodiment of the present disclosure, the present disclosure further provides a processing apparatus.

Figure 2:
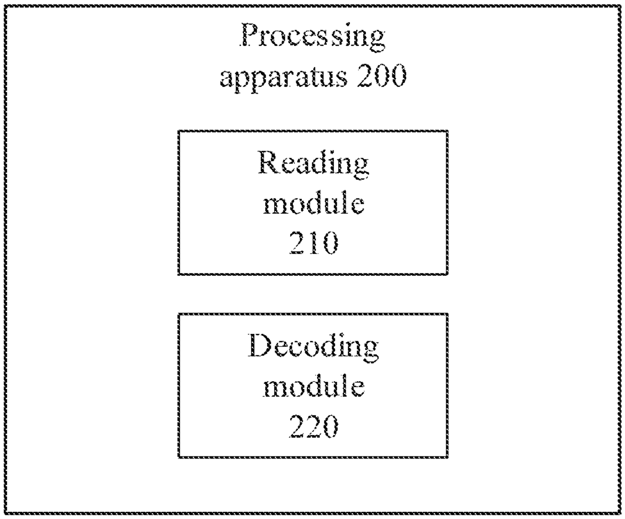
FIG. 2 illustrates a schematic diagram of a processing apparatus according to at least one embodiment of the present disclosure.

FIG. 2 illustrates a schematic diagram of a processing apparatus 200 according to at least one embodiment of the present disclosure. As illustrated in FIG. 2, the processing apparatus 200 includes a reading module 210 and a decoding module 220.

The reading module 210 is configured to: read two sets of burst data from a first storage channel and reading two sets of burst data from a second storage channel to obtain four sets of burst data, wherein the four sets of burst data correspond to encoded data stored in the first storage channel and the second storage channel, the encoded data is obtained by encoding k data symbols that are written into the first storage channel and the second storage channel, and the encoded data comprises the k data symbols and m check symbols, wherein a total bit width of the m check symbols is eight times a bit width of one error correcting symbol; and organize the four sets of burst data into a group of error correcting codewords, wherein the group of error correcting codewords comprises k read-back data symbols and m read-back check symbols.

The decoding module 220 is configured to: perform a decoding operation based on the group of error correcting codewords to obtain an error-corrected symbol.

Thus, the processing apparatus 200 according to at least one embodiment of the present disclosure implements the simultaneous error correction of two symbols or symbols by reading two sets of burst data from two storage channels respectively.

The above only describes the part of the processing apparatus 200 according to at least one embodiment of the present disclosure with reference to FIG. 2, and additional aspects of the processing apparatus 200 can refer to various aspects of the data processing method 100 described with reference to FIG. 1 of the present disclosure, and the effects of various aspects of the data processing method 100 described with reference to FIG. 1 according to the present disclosure can also be mapped to the processing apparatus 200 described with reference to FIG. 2 of the present disclosure, and details are not repeated here.

For example, the processing apparatus 200 according to at least one embodiment of the present disclosure alternatively or additionally includes an encoding module to execute the above encoding. For another example, the processing apparatus 200 according to at least one embodiment of the present disclosure may further include an error correction module to execute the above error correction operation.

An exemplary application scenario of encoding and decoding for utilizing the data processing method or processing apparatus according to at least one embodiment of the present disclosure is described below through FIG. 3 to FIG. 8. It can be understood that the application scenarios illustrated in FIG. 3 to FIG. 8 are only exemplary, and do not exhaustively illustrate various aspects of the above data processing method or processing apparatus, and the various aspects described with reference to FIG. 3 to FIG. 8 and the various aspects described with reference to FIG. 1 and FIG. 2 may be cross-referenced without exceeding the scope of the present disclosure.

In the exemplary application scenario of encoding and decoding, the method of simultaneously correcting two symbol positions can be based on the Vandermonde matrix.

For example, for a DDR memory, using the method structure can implement that two symbol positions can still be corrected simultaneously when an uncorrectable error occurs in the DDR memory.

The exemplary application scenario of encoding and decoding may include an encoding module, a decoding module, and an error correction module.

Figure 3:
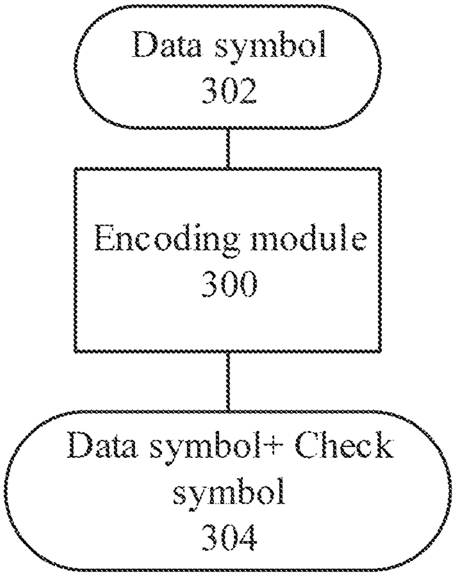
FIG. 3 illustrates a schematic diagram of an encoding module according to at least one embodiment of the present disclosure.

FIG. 3 illustrates a schematic diagram of an encoding module 300 according to at least one embodiment of the present disclosure.

Referring to FIG. 3, the input of the encoding module 300 is a data symbol 302, and the output is a data symbol and a check symbol 304. After certain mapping, the output data symbol and check symbol 304 are stored in a memory device through the DDR memory channel.

The encoding operation can be performed in the encoding module. In the encoding operation, m check symbols are obtained by multiplying the data symbol by the Vandermonde matrix, and the multiplication and addition used are both finite field operations. In response to k data symbols existing, the encoding matrix has (k+m) rows and k columns. The first k rows of the encoding matrix are an identity matrix, and the last m rows of the encoding matrix are a Vandermonde matrix, which multiplies the data symbols to obtain m check symbols.

FIG. 4 illustrates a schematic diagram of an encoding operation 400 according to at least one embodiment of the present disclosure, wherein k=8, m=4, a is a polynomial expression of finite field elements, and a=2. Referring to FIG. 4, the encoding matrix (the matrix on the left side of FIG. 4) has 12 rows and 8 columns. The first 8 rows of the encoding matrix are an identity matrix, e.g., all data symbols are directly transmitted without processing. The last 4 rows of the encoding matrix are a Vandermonde matrix. The encoding matrix is multiplied by the data symbols (the middle matrix in FIG. 4) to obtain an encoding matrix (the right matrix in FIG. 4). The encoded data includes the data symbols and 4 check data symbols (c0 to c3) obtained by encoding.

It can be understood that, k=8, m=4 and other parameters described in FIG. 4 and below with reference to FIG. 5 to FIG. 8 are just exemplary, the values of k, m and other parameters can be adjusted according to the actual requirement (e.g., referring to the examples described below in FIG. 9A to FIG. 9C, k=16), and the spreading encoding matrix, the decoding matrix, and the like are modulated accordingly.

FIG. 5 illustrates a schematic diagram of a decoding module 500 and an error correction module 550 according to at least one embodiment of the present disclosure.

Referring to FIG. 5, the input of the decoding module 500 is the data symbol and the check symbol 510 that are converted from the stored data read back from the DDR memory channel (e.g., corresponding to the above read-back encoded data) via the same mapping as the encoding module.

A decoding operation can be performed in the decoding module 500. In the decoding operation, the decoding matrix is used to multiply the k data symbols that are read back (e.g., corresponding to the above k read-back data symbols) and the m check symbols that are read back (e.g., corresponding to the above m read-back check symbols) to obtain m syndromes, s0, s1, s2, . . . , s3 (e.g., corresponding to the above syndrome).

FIG. 6 illustrates a schematic diagram of a decoding operation 600 according to at least one embodiment of the present disclosure, wherein k=8, m=4, a is a polynomial expression of finite field elements, and a=2. Referring to FIG. 6, the decoding matrix is a matrix of 4 rows and 12 columns, wherein the left 8 columns are the same Vandermonde matrix used in the encoding module, and the right 4 columns are an identity matrix. FIG. 6 illustrates the process for performing the decoding operation on 8 data from d0 to d7 and 4 check symbols from c0 to c3, and finally the obtained 4 syndromes, s0, s1, s2 and s3 are all 0, which indicates that the stored data that is read back have no error.

Continuously referring to FIG. 5, the input of the error correction module 550 is the output of the decoding module (e.g., m syndromes), and the output of the error correction module 550 is the corrected data symbols (which may also include the corrected check symbols) 520.

The error correction operation can be performed in the error correction module 550. Taking k=8, m=4, a is a polynomial expression of the finite field elements, and a=2 as an example, the error correction operation is described below.

In the error correction operation, the characteristic of the syndromes (s0, s1, s2, s3) is used to calculate the error symbol positions and values, and the specific steps are as follows:

Step 1. reading the syndromes (s0, s1, s2, s3);

Step 2. in response to (s0, s1, s2, s3) being all 0, indicating that all the read-back data symbols and check symbols have no error, and skipping to Step 6, otherwise skipping to Step 3;

Step 3. in response to 3 syndromes of (s0, s1, s2, s3) are 0, e.g., (s0, s1, s2, s3) having a single 1, indicating that one check symbol is erroneous, e.g., indicating that the corresponding check device (ecci, and i is 0 to 3) is erroneous, and skipping to Step 6, otherwise skipping to Step 4;

Step 4. performing the following six operations a) to f) on (s0, s1, s2, s3), and then skipping to Step 5;

Operation a). a dual data symbol error correction operation (2 data error correction), Operation b). a data and ecc0 error correction operation (data&ecc0 error correction), Operation c). a data and ecc1 error correction operation (data&ecc1 error correction), Operation d). a data and ecc2 error correction operation (data&ecc2 error correction), Operation e). a data and ecc3 error correction operation (data&ecc3 error correction), Operation f). a single data error correction operation, all the above operations a) to f) outputting: whether a solution exists, an error position, and an error value;

Step 5. using the error position solved by the operation to correct an error, then outputting the data symbol, and exiting; and Step 6. directly outputting the data symbol and exiting.

Operations a) to f) are described in detail below.

Operation a). the dual data symbol error correction operation is described below.

FIG. 7 illustrates a schematic diagram of a dual data symbol error correction operation 700 according to at least one embodiment of the present disclosure. The dual data symbol error correction operation is described below with reference to FIG. 7.

At first, a, b, and c are calculated by using the syndrome (s0, s1, s2, s3), and the calculation formula is as follows:

$$a = s_1^2 + s_0 s_2,$$

-continued $$b = s_1 s_2 + s_0 s_3,$$

and $$c = s_1 s_3 + s_2^2,$$

a, b, and c can be used to construct the quadratic equation $ax^2+bx+c=0$ in the finite field. In response to a being 0, the module has no solution. In response to a being not 0, making $$y = \frac{ax}{b},$$
$$u = \frac{ac}{b^2}$$

to transform the equation into:

$$y^2 + y + u = 0;$$

next, whether the quadratic equation is solvable can be found out, and the values of y and y' (intermediate variables) can be obtained through an XOR operation. The specific process of obtaining the values of y and y' (intermediate variable) through the XOR operation is described below with reference to FIG. 8.

Then, the error positions x and x' are obtained by making $$x = \log\left(y * \frac{b}{a}\right)$$

and $$x' = \log\left(y' * \frac{b}{a}\right);$$

the error positions and the syndrome are used to calculate the error values $e_x$ and $e_{x'}$, wherein $$e_x = \frac{s_0 2^{x'} + s_1}{2^x + 2^{x'}},$$

and $$e_{x'} = s_0 + e_x.$$

Figure 8:
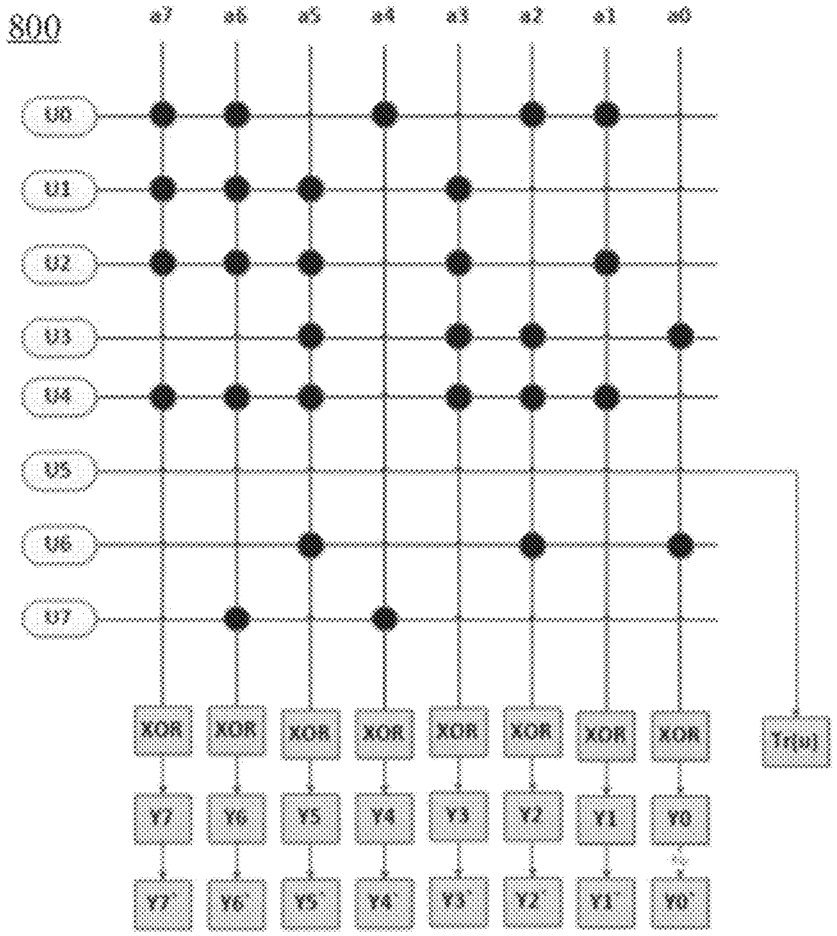
FIG. 8 illustrates a schematic diagram of solving a quadratic equation in a finite field according to at least one embodiment of the present disclosure.

FIG. 8 illustrates a schematic diagram 800 of solving a finite-field quadratic equation (e.g., $y^2+y+u=0$) according to at least one embodiment of the present disclosure. In FIG. 8, both y and u are 8-bit finite-field numbers.

Referring to FIG. 8, U0 to U7 on the left are inputs, wherein U0 to U7 respectively indicate the 0th bit to the 7th bit of u. Y0 to Y7 and Y0' to Y7' on the lower side of the figure are outputs, and the two roots of $y^2+y+u=0$ are y and y', wherein Y0 to Y7 respectively indicate the 0th bit to the 7th bit of y, and Y0' to Y7' respectively indicate the 0th bit to the 7th bit of y';

Y0 to Y7 and Y0' to Y7' satisfy the following relationship:

Y0=not Y0' (or Y0' xor 1, please note that inversion is equivalent to XOR with 1)

Y1=Y1",

Y2=Y2',

Y3=Y3',

Y4=Y4',

Y5=Y5',

Y6=Y6',

Y7=Y7',

Tr(u) indicates whether $y^2+y+u=0$ has a solution, in response to Tr(u)=1, then the equation has no solution, in response to Tr(u)=0, then the equation has a solution, and in response to 8-bit symbol, then Tr(u)=U5.

In response to u=24, the two roots of $y^2+y+24=0$ are calculated, and then U3=1, U4=1, U0, U1, U2, U5, U6 and U7=0, U5=Tr(u)=0, the equation has a solution, and Y7=U0 xor U1 xor U2 xor U4, Y6=U0 xor U1 xor U2 xor U4 xor U7, Y5=U1 xor U2 xor U3 xor U4 xor U6, Y4=U0 xor U7, Y3=U1 xor U2 xor U3 xor U4, Y2=U0 xor U3 xor U4 xor U6, Y1=U0 xor U2 xor U4, Y0=U3 xor U6, thus, y[7:0]=8'b11000011=195 can be obtained, and flipping the last bit (the flip between Y0 and Y0' in FIG. 8) can obtain y'[7:0]=8'b11000010=194, wherein 195 and 194 are the two roots of $y^2+y+24=0$.

The above describes a mathematical operation method with reference to FIG. 8 to solve the finite-field quadratic equation $y^2+y+u=0$. However, the embodiment is not limited thereto, and the finite-field quadratic equation $y^2+y+u=0$ may also be solved by a lookup table method. For example, when u is equal to 24, and the 24th entry is found in the lookup table, the 24th entry stores the values of y and y' (16 bits are not required to be stored, because the last bits of y and y' are opposite, it is enough to save the 7 bits of y [7:1], and y and y' are obtained by reading the values of y and y' from the table and adding 0 or 1).

Operation b). the data and ecc0 error correction operation is described below.

This operation assumes that the value of ecc0 is erroneous, in response to $$\frac{s3}{s2} = \frac{s2}{s1} = 2^x,$$

then the error positions are x and ecc0 respectively, and the error values are $$\frac{s1}{2^x}$$

and $$\frac{s1}{2^x} \oplus s0$$

respectively.

Operation c). the data and ecc1 error correction operation are described below.

This operation assumes that the value of ecc1 is erroneous, in response to $$\frac{s3}{s2} = 2^x \text{ and } \frac{s2}{s0} = 2^{2x},$$

then the error positions are x and ecc1 respectively, and the error values are s0 and s0*$2^n$⊕s1 respectively.

Operation d). the data and ecc2 error correction operation is described below.

This operation assumes that the value of ecc2 is erroneous, in response to $$\frac{s1}{s0} = 2^x \text{ and } \frac{s3}{s1} = 2^{2x},$$

then the error positions are x and ecc2 respectively, and the error values are s0 and s1*$2^n$⊕s2 respectively.

Operation e). the data and ecc3 error correction operation are described below.

This operation assumes that the value of ecc3 is erroneous, in response to $$\frac{s1}{s0} = \frac{s2}{s1} = 2^{2x},$$

then the error positions are x and ecc3 respectively, and the error values are s0 and s2*$2^n$⊕s3 respectively.

Operation f). the single data error correction operation is described below.

In response to $$\frac{s3}{s2} = \frac{s2}{s1} = \frac{s1}{s0} = 2^x,$$

then the error position is x, and the error value is s0.

The above operations a) to f) are only responsible for the error correction of a single data symbol, and Step 3 can be responsible for the error correction of a single check symbol.

In an exemplary application scenario of encoding and decoding, a simultaneous error correction of two symbol positions can be implemented by using a Vandermonde matrix. In addition, in response to only one symbol being erroneous, the error correction can be completed by using the same matrix without changing the algorithm. In the exemplary application scenario of encoding and decoding, the error correction capability of a DDR memory can be improved effectively and the memory reliability is enhanced.

For example, in the exemplary application scenario of encoding and decoding, the error of any 1 or 2 symbols can be corrected simultaneously by using 4 check symbols. For example, in the exemplary application scenario of encoding and decoding, when only one position has an error, the correct rate of error correction reaches 100%. For example, in the exemplary application scenario of encoding and decoding, the problem of reporting a UE due to errors existing in two positions simultaneously can be solved, and the problem of data loss is solved. For example, in the exemplary application scenario of encoding and decoding, in response to the correctness of ECC devices being guaranteed, the correct rate of correcting errors of two random data symbols can also reach 100%, e.g., solutions exist for a plurality of cases in the above six situations.

For example, in the exemplary application scenario of encoding and decoding, the quadratic equation constructed based on the Vandermonde matrix can be solved quickly, thereby providing the speed of simultaneously and arbitrarily (for the symbol position) finding two solutions (the positions of the erroneous symbol). For example, in the exemplary application scenario of encoding and decoding, the characteristic of the quadratic equation in the finite field can be used to judge the number of errors quickly, and judge whether the error position includes check devices, which improve the probability of correcting errors. For example, in the exemplary application scenario of encoding and decoding, the operations a) to f) can be performed in parallel during the error correction process to obtain all possible error positions and error values.

In an additional aspect of the exemplary application scenario of encoding and decoding, the encoding matrix may be replaced, for example, the Vandermonde matrix may be replaced by a series of transformations of the Vandermonde matrix, such as the left-right flip, up-down flip, transposition, and other operations.

In an additional aspect of the exemplary application scenario of encoding and decoding, symbols of arbitrary bit can be used to implement. For example, for GF($2^n$), Table 2 illustrates the bit width and upper limit quantity of the symbols according to at least one embodiment of the present disclosure.

TABLE 2

The bit width and upper limit quantity of symbols.

| | Bit width | Quantity |
|---|---|---|
| Data symbol | ≤n | $\leq 2^n - 1$ |
| Check symbol | n | $\leq 2^n$ |

As seen from Table 2, the bit widths of the data symbol and the check symbol may be inconsistent. For example, the data symbol is not limited to the bit width of the data memory device, for example, the bit width of the data symbol may be larger than the bit width of the data memory device. For example, now 2 errors in 6 4-bit data symbols are required to be corrected, then the error correcting code may be defined on GF($2^4$) to generate 4 4-bit check symbols to form a total bit width of (24+16) bits. The error correcting code may also be defined on GF($2^5$), and 0 is added before each 4-bit data symbol to obtain a 5-bit data symbol, so as to generate 4 5-bit check symbols (so that the error correction capability is stronger), and a total bit width is (24+20) bits at this time.

The above exemplary application scenario of encoding and decoding is only a part or an additional aspect of the data processing method and processing apparatus according to at least one embodiment of the present disclosure. Other aspects of the exemplary application scenario of encoding and decoding can refer to the data processing method and processing apparatus, and additional aspects thereof.

In the exemplary application scenario of encoding and decoding, the method of simultaneously correcting the positions of two symbols can be based on the Vandermonde matrix. For example, for a DDR memory, the structure of the method can be used to implement a simultaneous error correction when an uncorrectable error occurs in the DDR memory.

An exemplary application scenario of organizing error correcting codewords (ECC words) of the data processing method or the processing apparatus according to at least one embodiment of the present disclosure is described below with reference to FIG. 9A to FIG. 9C. It can be understood that the application scenario illustrated in FIG. 9A to FIG. 9C are only exemplary, and do not exhaustively illustrate various aspects of the above data processing method or the processing apparatus, and all aspects described with reference to FIG. 9A to FIG. 9C and all aspects described with reference to FIG. 1 and FIG. 2, and FIG. 3 to FIG. 8 may be cross-referenced without exceeding the scope of the present disclosure.

In the exemplary application scenario of organizing ECC words, a group of ECC words can be obtained, and the group of ECC words includes data symbols and check symbols. These data symbols and check symbols can correspond to the above data symbols and check symbols in the exemplary application scenario of encoding and decoding described with reference to FIG. 3 to FIG. 8, so as to implement the corresponding encoding and decoding functions, and finally implement the simultaneous error correction of two symbols.

In the example application scenario of organizing ECC words, memory controller includes two memory channels Ch0 and Ch1 and is applied to DDR memory, and the bit width of memory devices (data memory devices and check memory devices ecc) included in each DDR memory is 4 bits. It should be understood that the embodiment is not limited thereto, and other variations can exist.

Figure 9A:
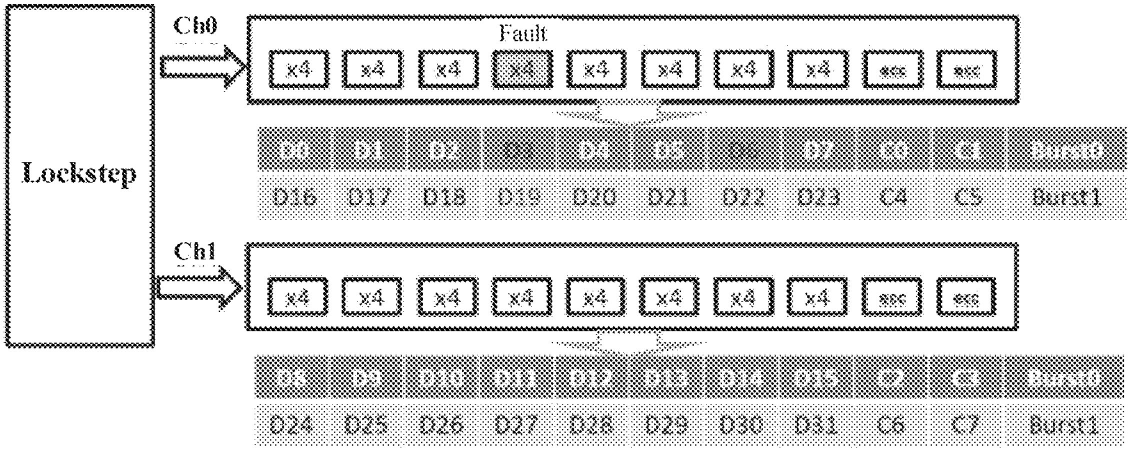
FIG. 9A illustrates a structural schematic diagram of a memory of a fixed error and a random error according to at least one embodiment of the present disclosure.
Figure 9B:
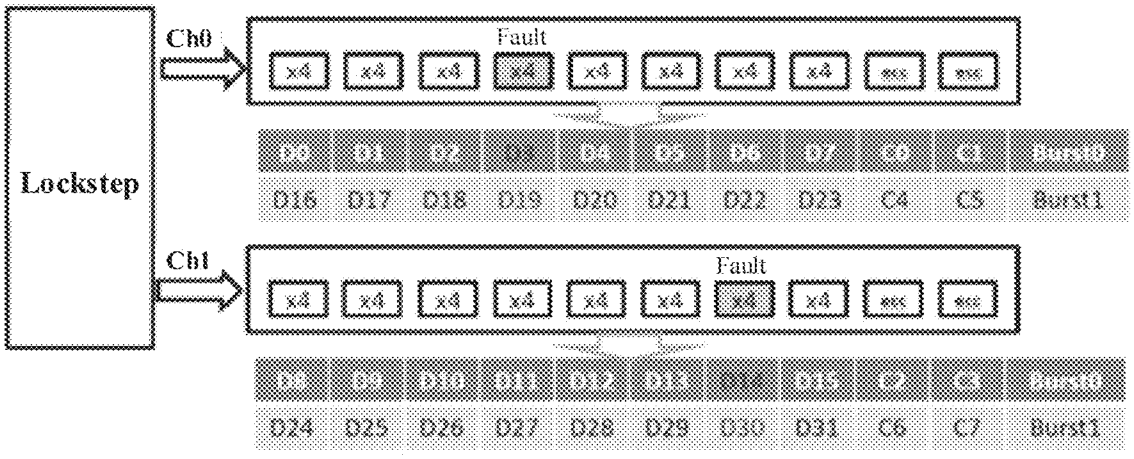
FIG. 9B illustrates a structural schematic diagram of a memory of two fixed errors according to at least one embodiment of the present disclosure.
Figure 9C:
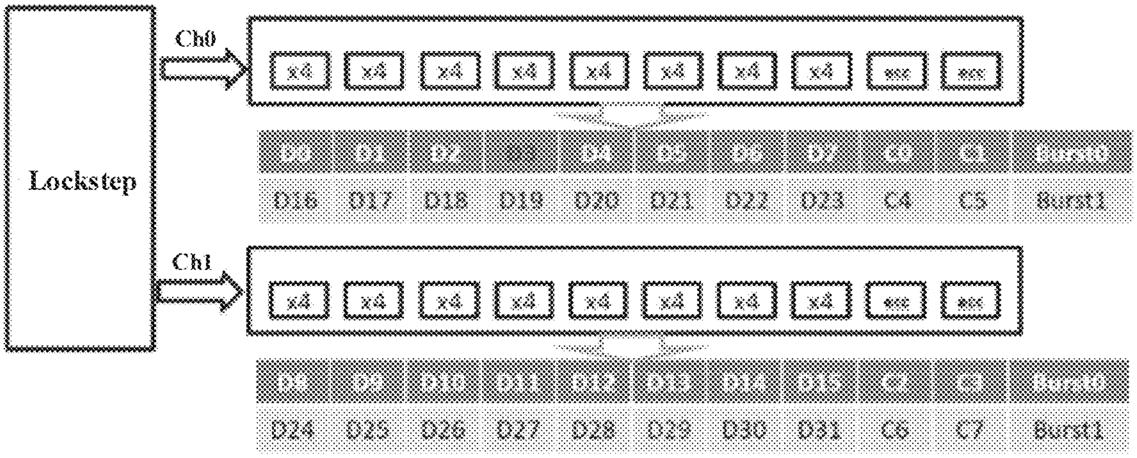
FIG. 9C illustrates a structural schematic diagram of a memory of two random errors according to at least one embodiment of the present disclosure.

FIG. 9A illustrates a structural schematic diagram of a memory of a fixed error and a random error according to at least one embodiment of the present disclosure. FIG. 9B illustrates a structural schematic diagram of a memory of two fixed errors according to at least one embodiment of the present disclosure. FIG. 9C illustrates a structural schematic diagram of a memory of two random errors according to at least one embodiment of the present disclosure.

Exemplary aspects of organizing ECC words are described below with reference to FIG. 9A. Referring to FIG. 9A, a memory system may include a lockstep, a memory channel Ch0, a memory channel Ch1, and a memory including a plurality of memory devices (memory devices shown by x4 and ecc, as shown). Exemplarily, the lockstep, the memory channel Ch0, and the memory channel Ch1 may be included in a memory controller.

At first, the lockstep function of the memory is open, so as to implement a synchronous operation on the memory channel Ch0 and the memory channel Ch1, such as writing, reading, and other operations.

In an exemplary process of writing data, a set of data is written into the memory channel Ch0 and the memory channel Ch1, for example, through the above encoding process, e.g., the write operation of the data to be written into the memory channel Ch0 and the memory channel Ch1 is implemented synchronously. For example, the set of data is, for example, 256 bits, the first 128 bits are written into the memory channel Ch0, for example, written into 4 sets of burst data, and the last 128 bits are written into the memory channel Ch1, for example, written into 4 burst data. It can be understood that it is only exemplary, and the set of data may include other quantities of bits or be written into other quantities of burst data. In addition, the data for writing can be written continuously. For example, as illustrated in FIG. 9A, half of the data for writing may be written into the memory channel Ch0, and the other half of the data for writing may be written into the memory channel Ch1.

In the exemplary process of reading data, two sets of burst data are read from memory channel Ch0 and memory channel Ch1 respectively, e.g., two sets of burst data Burst0 and Burst1 are read from memory channel Ch0, and two sets of burst data Burst0 and Burst1 are read from memory channel Ch1. The four sets of burst data here correspond to the data symbols and check symbols generated by encoding the written data, for example, based on the Vandermonde-like matrix.

An exemplary composition structure of an ECC word may be:

symbol 0 being DO of Burst0 of the first x4 data memory device of Ch0 and D16 of Burst1 of the first x4 data memory device of Ch0, and the two sets of data being 8 bits in total to form a symbol, e.g., symbol 0;

symbol 1 being D1 of Burst0 of the second x4 data memory device of Ch0 and D17 of Burst1 of the second x4 data memory device of Ch0, and the two sets of data being 8 bits in total to form a symbol, e.g., symbol 1;

symbol 2 being D2 of Burst of the third x4 data memory device of Ch0 and D18 of Burst1 of the third x4 data memory device of Ch0, and the two sets of data being 8 bits in total to form a symbol, e.g., symbol 2;

symbol 3 being the D3 of Burst0 of the fourth x4 data memory device of Ch0 and D19 of Burst1 of the fourth x4 data memory device of Ch0, and the two sets of data being 8 bits in total to form a symbol, e.g., symbol 3;

symbol 7 being the D7 of Burst0 of the eighth x4 data memory device of Ch0 and D23 of Burst1 of the eighth x4 data memory device of Ch0, and the two sets of data being 8 bits in total to form a symbol, e.g., symbol 7;

symbol 8 being the D8 of Burst0 of the first x4 data memory device of Ch1 and D24 of Burst1 of the first x4 data memory device of Ch1, and the two sets of data being 8 bits in total to form a symbol, e.g., symbol 8;

symbol 9 being D9 of Burst0 of the second x4 data memory device of Ch1 and D25 of Burst1 of the second x4 data memory device of Ch1, and the two sets of data being 8 bits in total in total to form a symbol, e.g., symbol 9;

symbol 10 being D10 of Burst0 of the third x4 data memory device of Ch1 and D26 of Burst1 of the third x4 data memory device of Ch1, and the two sets of data being 8 bits in total to form a symbol, e.g., symbol 10;

symbol 11 being D11 of Burst0 of the fourth x4 data memory device of Ch1 and D27 of Burst1 of the fourth x4 data memory device of Ch1, and the two sets of data being 8 bits in total to form a symbol, e.g., symbol 11;

symbol 15 being D15 of Burst0 of the eighth x4 data memory device of Ch1 and D31 of Burst1 of the eighth x4 data memory device of Ch1, and the two sets of data being 8 bits in total to form a symbol, e.g., symbol 15;

similar to the data memory devices, the two sets of burst data of the two x4 check data of Ch0 and Ch1 respectively forming 4 check symbols (ecc symbols), as follows:

symbol 16 being C0 of Burst0 of the first x4 error correcting memory device of Ch0 and C4 of Burst1 of the first x4 error correcting memory device of Ch0, and the two check codes being 8 bits in total to form a symbol, e.g., symbol 16;

symbol 17 being C1 of Burst of the second x4 error correcting memory device of Ch0 and C5 of Burst1 of the second x4 error correcting memory device of Ch0, and the two check codes being 8 bits in total to form a symbol, e.g., symbol 17;

symbol 18 being C2 of Burst0 of the first x4 error correcting memory device of Ch1 and C6 of Burst1 of the first x4 error correcting memory device of Ch1, and the two check codes being 8 bits in total to form a symbol, e.g., symbol 18; and symbol 19 being C3 of Burst0 of the second x4 error correcting memory device of Ch1 and C7 of Burst1 of the second x4 error correcting memory device of Ch0, and the two check codes being 8 bits in total to form a symbol, e.g., symbol 19.

A group of ECC words formed thus is 16 data symbols and 4 check symbols, wherein the data information is 128 bits in total, and the check information is 32 bits in total.

The ECC words organized in the above way may use the Vandermonde matrix algorithm described in FIG. 3 to FIG. 8 to implement the decoding operation, which for example, achieves a case that one ECC operation can simultaneously correct two errors that occur in two memory devices simultaneously, and does not need to use the method of replacing memory devices as a DDDC does.

An exemplary scenario where two memory devices have errors simultaneously can refer to FIG. 9A to FIG. 9C.

FIG. 9A illustrates a case where a fixed error and a random error exist, wherein a fixed error occurs in the fourth data memory device in memory corresponding to Ch0 (illustrated as a fault of the fourth data memory device, causing errors in D3 and D19), and a random error occurs in the seventh data memory device in memory corresponding to Ch0 (causing an error in D6). The fixed error and random error may be in the same memory channel, or be in two memory channels respectively.

FIG. 9B illustrates a case where two fixed errors exist, wherein a fixed error occurs in the fourth data memory device in memory corresponding to Ch0 (illustrated as a fault of the fourth data memory device, causing errors in D3 and D19), and a random error occurs in the seventh data memory device in memory corresponding to Ch1 (illustrated as a fault of the seventh data memory device, causing errors in D14 and D30). Errors of two memory devices can occur simultaneously in the same memory channel, or two memory channels respectively.

FIG. 9C illustrates a case where two random errors exist, wherein a fixed error occurs in the fourth data memory device in memory corresponding to Ch0 (causing an error in D3), and a random error occurs in the sixth data memory device in memory corresponding to Ch1 (causing an error in D29). Errors of two memory devices can occur simultaneously in the same memory channel, or in two memory channels respectively, and the random error may be any one of the two sets of burst data.

In the above exemplary application scenario, when errors occur in two data memory devices simultaneously, the error correction can be completed by only using the hardware structure without the participation of software, recording the error correction history, and the replacement of memory devices, the problem of reporting an uncorrectable error due to errors existing in two positions can be solved, thereby improving the reliability of the memory and reducing the risk of data loss and downtime.

The above exemplary application scenarios are only part or additional aspects of the data processing method and processing apparatus according to at least one embodiment of the present disclosure. Other aspects of the above exemplary application scenario can refer to the data processing method and processing apparatus according to at least one embodiment of the present disclosure and the additional aspects thereof.

Figure 10:
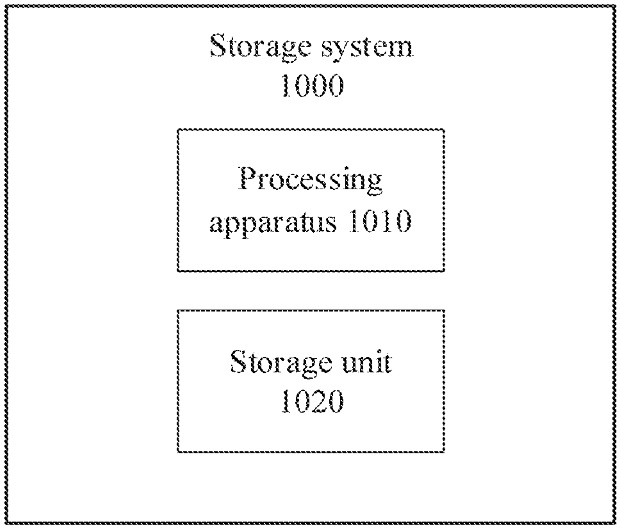
FIG. 10 illustrates a schematic diagram of a storage system according to at least one embodiment of the present disclosure.

FIG. 10 illustrates a schematic diagram of a storage system 1000 according to at least one embodiment of the present disclosure. As illustrated in FIG. 10, a storage system 1000 includes a processing apparatus 1010 and a storage unit 1020.

The processing apparatus 1010 may be the processing apparatus 200 described above with reference to FIG. 2, and the storage unit 1020 may be a memory for data storage.

Therefore, for the processing apparatus 200 of the embodiments of the present disclosure, various aspects thereof may also be mapped to the storage system 1000 described with reference to FIG. 10, which is not repeated here.

Figure 11:
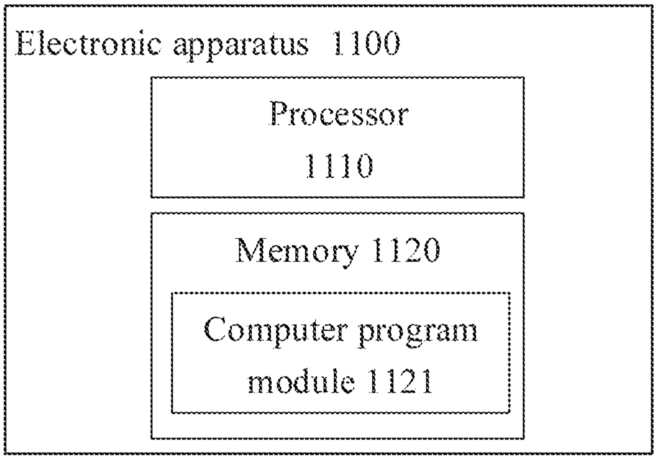
FIG. 11 illustrates a schematic diagram of an electronic apparatus according to at least one embodiment of the present disclosure.

FIG. 11 illustrates a schematic diagram of an electronic apparatus 1100 according to at least one embodiment of the present disclosure.

As illustrated in FIG. 11, the electronic apparatus 1100 includes a processor 1110 and a memory 1120. Memory 1120 includes one or more computer program modules 1121. One or more computer program modules 1121 are stored in the memory 1120 and configured to be executed by the processor 1110. One or more computer program modules 1121 include instructions that are used to execute the data processing method according to at least one embodiment of the present disclosure. When the instructions are executed by the processor 1110, one or more steps of the data processing method according to at least one embodiment of the present disclosure and additional aspects thereof may be executed. The memory 1120 and the processor 1110 may be interconnected by a bus system and/or other forms of connection mechanisms (not illustrated). For example, the bus may be a Peripheral Component Interconnect (PCI) bus, an Extended Industry Standard Architecture (EISA) bus, or the like. The communication bus may be divided into an address bus, a data bus, a control bus, and the like.

Exemplarily, the processor 1110 may be a central processing unit (CPU), a digital signal processor (DSP), or other forms of processing units with data processing capability and/or program execution capability, such as a field programmable gate array (FPGA), and the like; for example, the central processing unit (CPU) may be an X86 or ARM architecture, a RISC-V architecture, and the like. The processor 1110 can be a general-purpose processor or a special-purpose processor, and can control other components in the electronic apparatus 1100 to execute the desired functions.

Exemplarily, the memory 1120 may include any combination of one or more computer program products, and the computer program products may include various forms of computer-readable storage media, such as volatile memory and/or non-volatile memory. The volatile memory may include, for example, random access memory (RAM) and/or cache memory (cache), and the like. The non-volatile memory may include, for example, a read only memory (ROM), a hard disk, an erasable programmable read only memory (EPROM), a compact disc read only memory (CD-ROM), a USB memory, a flash memory, and like. One or more computer program modules 1121 can be stored on a computer-readable storage medium, and the processor 1110 can execute one or more computer program modules 1121 to implement various functions of the electronic apparatus 1100. The computer-readable storage medium may further store various application programs, various data, and various data used and/or generated by the application programs.

For example, the electronic apparatus 1100 may further include an input apparatus such as a touch screen, a touchpad, a keyboard, a mouse, a camera, a microphone, an accelerometer, a gyroscope, and the like; include an output apparatus such as a liquid crystal display, a speaker, a vibrator, and the like; include an storage apparatus such as a magnetic tape, a hard disk (HDD or SDD); further include a communication apparatus such as a LAN card, a network interface card of a modem, and the like. The communication apparatus may allow the electronic apparatus 1100 to perform wireless or wired communication with other devices to exchange data, and perform communication processing via a network such as the Internet. A driver is connected to the I/O interface as required. A removable storage medium, such as a magnetic disk, an optical disk, a magneto-optical disk, a semiconductor memory, and the like, is installed on the driver as required, so that the computer program read therefrom is installed into the storage device as required.

For example, the electronic apparatus 1100 may further include a peripheral interface (not illustrated in the figure) and the like. The peripheral interface may be various types of interfaces, such as a USB interface, a lightning interface, and the like. The communication apparatus can communicate with networks and other devices through wireless communication, the network, for example, is the Internet, an intranet and/or a wireless network such as a cellular telephone network, a wireless local area network (LAN) and/or a metropolitan area network (MAN). Wireless communications can use any one of a variety of communications standards, protocols, and technologies, including but not limited to Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wi-Fi (e.g. based on IEEE 802.11a, IEEE 802.11b, IEEE 802.11g and/or IEEE 802.11n standards), Voice over Internet Protocol (VOIP), Wi-MAX, protocols for emails, instant messaging and/or Short Message Service (SMS), or any other suitable communication protocols.

The electronic apparatus 1100 may be, for example, a system-on-chip (SOC) or a device including the SOC, for example, may be any device such as a mobile phone, a tablet computer, a notebook computer, an e-book, a game console, a television, a digital photo frame, a navigator, a household appliance, a communication base station, an industrial controller, a server, and the like, may also be a combination of any processing apparatus and hardware, which is not limited by the embodiments of the present disclosure. For the specific functions and technical effects of the electronic apparatus 1100 can refer to the above description of the data processing method and its additional aspects according to at least one embodiment of the present disclosure, which are not repeated here.

Figure 12:
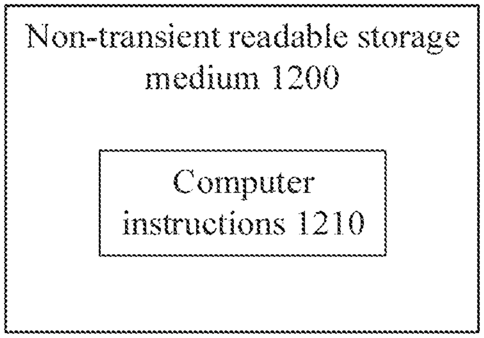
FIG. 12 illustrates a schematic diagram of a non-transient readable storage medium according to at least one embodiment of the present disclosure.

FIG. 12 illustrates a schematic diagram of a non-transient readable storage medium 1200 according to at least one embodiment of the present disclosure.

As illustrated in FIG. 12, the non-transient readable storage medium 1200 stores computer instructions 1210. When the computer instructions 1210 are executed by a processor, one or more steps of the above data processing method and its additional aspects are executed.

Exemplarily, the non-transient readable storage medium 1200 may be any combination of one or more computer-readable storage media. For example, a computer-readable storage medium includes a program code for reading two sets of burst data from a first storage channel and reading two sets of burst data from a second storage channel to obtain four sets of burst data, a program code for organizing the four sets of burst data into a group of error correcting codewords, and a program code for performing a decoding operation based on the group of error correcting codewords to obtain an error-corrected symbol.

Exemplarily, when the program code is read by a computer, the computer can execute the program code stored in the computer storage medium, and execute, for example, one or more steps of the data processing method and its additional aspects according to at least one embodiment of the present disclosure.

Exemplarily, the non-transient readable storage medium may include a memory card of a smartphone, a storage component of a tablet computer, a hard disk of a personal computer, random access memory (RAM), a read-only memory (ROM), an erasable programmable read only memory (EPROM), a Compact Disc Read Only Memory (CD-ROM), a flash memory, and other non-transient readable storage media or any combination thereof.

In the foregoing detailed description, for purposes of explanation and not limitation, specific details have been set forth in order to provide a thorough understanding of the various aspects and embodiments described in the present disclosure. In some cases, the detailed descriptions of well-known devices, components, circuits, and methods are omitted so as not to obscure the description of the embodiments disclosed herein with unnecessary detail. All statements of the principles, aspects, and embodiments of the present recited herein, as well as specific examples thereof, are intended to cover both the structural equivalents and the functional equivalents thereof. Additionally, such equivalents are intended to include both the currently known equivalents as well as the equivalents developed in the future, e.g., any elements developed to perform the same function, regardless of the structure. Thus, for example, it is understood that block diagrams herein may indicate conceptual views of illustrative circuits or other functional units that represent the principles of the described embodiments. Such functions and illustrated functional blocks are understood as being hardware-implemented and/or computer-implemented.

Various embodiments of the present disclosure are described in a progressive manner, each embodiment focuses on the differences from other embodiments, and the same and similar parts of the various embodiments may be referred to each other.

It should be noted that relational terms such as first, second, etc. are only used to distinguish one entity or operation from another entity or operation, and do not necessarily require or imply that there is any actual relationship or sequence between these entities or operations. The terms “include”, “including” or any other variation thereof are intended to cover a non-exclusive inclusion, so that the process, method, object or apparatus including a series of elements not only include those elements, but further include other elements that are not listed definitely, or further include elements inherent to such the process, method, object, or apparatus. Without more limitations, the element defined by the statement “including . . . ” does not exclude the presence of additional same elements in the process, method, object, or device that includes the elements.

The above descriptions are only preferred embodiments of the present disclosure, and are not intended to limit the present disclosure, and the scope of the present disclosure is determined by claims.

What is claimed is:

1. A data processing method, comprising:

reading two sets of burst data from a first storage channel and reading two sets of burst data from a second storage channel to obtain four sets of burst data, wherein the four sets of burst data correspond to encoded data stored in the first storage channel and the second storage channel, the encoded data is obtained by encoding k data symbols that are written into the first storage channel and the second storage channel, and the encoded data comprises the k data symbols and m check symbols, wherein a total bit width of the m check symbols is eight times a bit width of one error correcting symbol;

organizing the four sets of burst data into a group of error correcting codewords, wherein the group of error correcting codewords comprises k read-back data symbols and m read-back check symbols; and performing a decoding operation based on the group of error correcting codewords to obtain an error-corrected symbol, wherein encoding the k data symbols that are written into the first storage channel and the second storage channel, comprises:

encoding the k data symbols based on an encoding matrix; and performing the decoding operation based on the group of error correcting codewords to obtain the error-corrected symbol comprises:

decoding the group of error correcting codewords based on a decoding matrix to obtain syndrome, and utilizing the syndrome to obtain the error-corrected symbol, wherein the encoding matrix is a matrix of at least (k+m) rows and at least k columns and comprises a Vandermonde-like matrix, and the decoding matrix is a matrix of at least m rows and at least (k+m) columns and comprises the Vandermonde-like matrix, wherein the Vandermonde-like matrix is a matrix associated with a Vandermonde matrix, wherein $k \leq p^n - 1$, $m \leq p^n$, n is a number of bits per symbol, and p is a capacity of a single bit.

2. The processing method according to claim 1, wherein organizing the four sets of burst data into the group of error correcting codewords comprises:

combining burst data, corresponding to a same memory device, in the two sets of burst data that are read from the first storage channel into one error correcting codeword symbol to obtain a first-part error correcting codeword;

combining burst data, corresponding to a same memory device, in the two sets of burst data that are read from the second storage channel into one error correcting codeword symbol to obtain a second-part error correcting codeword; and combining the first-part error correcting codeword and the second-part error correcting codeword.

3. The processing method according to claim 1, wherein:

the encoding matrix comprises a first interval and a second interval, wherein the first interval comprises an identity matrix of k rows and k columns, and the second interval comprises a Vandermonde-like matrix of m rows and k columns; and encoding the k data symbols based on the encoding matrix to obtain the encoded data comprises:

multiplying the k data symbols by the identity matrix of k rows and k columns to obtain the k data symbols; and multiplying the k data symbols by the Vandermonde-like matrix of m rows and k columns to obtain the m check symbols.

4. The processing method according to claim 1, wherein:

the decoding matrix comprises a third interval and a fourth interval, wherein the third interval comprises a Vandermonde-like matrix of m rows and k columns, and the fourth interval comprises an identity matrix of m rows and m columns; and decoding the group of error correcting codewords based on the decoding matrix to obtain the syndrome comprises:

multiplying the k read-back data symbols and the m read-back check symbols by the decoding matrix to obtain the syndrome.

5. The processing method according to claim 1, wherein utilizing the syndrome to obtain the error-corrected symbol, comprises:

reading the syndrome;

outputting, in response to all the syndrome being "0", the k read-back data symbols as the error-corrected symbol, wherein all the syndrome being "0" indicates that the k read-back data symbols and the m read-back check symbols are correct;

outputting, in response to the syndrome having a single "1", the k read-back data symbols as the error-corrected symbol, wherein the syndrome having a single "1" indicates that the k read-back data symbols are correct and a read-back check symbol, corresponding to the single "1" of the syndrome, in the m read-back check symbols is erroneous; and utilizing, in response to the syndrome having v "1"s, the syndrome to perform an error correction on an error symbol in the k read-back data symbols and the m read-back check symbols to obtain the error-corrected symbol, wherein the syndrome having v "1"s indicates that v1 read-back data symbols, corresponding to "1" of the syndrome, in the k read-back data symbols have an error, and v2 read-back check symbols, corresponding to "1" of the syndrome, in the m read-back check symbols have an error, wherein $v \geq 2$, $v1 \leq m$, $v2 \leq m$, and $v1+v2=v$.

6. The processing method according to claim 5, wherein utilizing the syndrome to perform the error correction on the error symbol in the k read-back data symbols and the m read-back check symbols to obtain the error-corrected symbol, comprises:

utilizing the syndrome to determine an error position and an error value of the error symbol in the k read-back data symbols and the m read-back check symbols; and utilizing the error position to perform the error correction on the error symbol to obtain the error-corrected symbol.

7. The processing method according to claim 6, wherein utilizing the syndrome to determine the error position and the error value of the error symbol in the k read-back data symbols and the m read-back check symbols, comprises:

1) Performing a dual data symbol error correction operation, comprising:

utilizing the syndrome to construct a multi-degree equation; and solving the error position and the error value based on the multi-degree equation;

2) Performing an error correction operation of a single data symbol and a single check symbol, comprising:

on an assumption that a value of the single check symbol is erroneous, solving the error position and the error value, based on a ratio relationship between the syndrome being equal to a ratio relationship between elements of a Vandermonde-like matrix corresponding to the syndrome; and 3) performing a single-data symbol error correction operation, comprising:

solving the error position and the error value, based on the ratio relationship between the syndrome being equal to the ratio relationship between the elements of the Vandermonde-like matrix corresponding to the syndrome.

8. The processing method according to claim 7, wherein the multi-degree equation is a quadratic equation, p=2, m=4, and the syndrome is (s0, s1, s2, s3), wherein utilizing the syndrome to construct the multi-degree equation, comprises:

constructing a quadratic equation $ax^2+bx+c=0$, wherein $$a = s_1^2 + s_0 s_2,$$

$$b = s_1 s_2 + s_0 s_3, \text{ and}$$

$$c = s_1 s_3 + s_2^2,$$

wherein solving the error position and the error value based on the multi-degree equation, comprises:

in response to a not being 0, making $$y = \frac{ax}{b} \text{ and } u = \frac{ac}{b^2}$$

to transform the quadratic equation into:

$$y^2 + y + u = 0;$$

obtaining two roots y and y' of $y^2+y+u=0$;

making $$x = \log\left(y * \frac{b}{a}\right) \text{ and } x' = \log\left(y' * \frac{b}{a}\right)$$

to obtain error positions x and x'; and utilizing the error positions and the syndrome to calculate error values $e_x$ and $e_{x'}$, wherein $$e_x = \frac{s_0 2^{x'} + s_1}{2^x + 2^{x'}}, \text{ and}$$

$$e_{x'} = s_0 + e_x,$$

wherein on the assumption that the value of the single check symbol is erroneous, solving the error position and the error value, based on the ratio relationship between the syndrome being equal to the ratio relationship between the elements of the Vandermonde-like matrix corresponding to the syndrome, comprises:

on an assumption of a value of a check memory device ecc0 corresponding to s0 being erroneous, calculating, based on $$\frac{s3}{s2} = \frac{s2}{s1} = 2^x,$$

that the error positions are x and the check memory device ecc0, respectively, and the error values are $$\frac{s1}{2^x} \text{ and } \frac{s1}{2^x} \oplus s0,$$

respectively;

on an assumption of a value of a check memory device ecc1 corresponding to s1 being erroneous, calculating, based on $$\frac{s3}{s2} = 2^x \text{ and } \frac{s2}{s0} = 2^{2x},$$

that the error positions are x and the check memory device ecc1, respectively, and the error values are s0 and $s0*2^x \oplus s1$, respectively;

on an assumption of a value of a check memory device ecc2 corresponding to s2 being erroneous, calculating, based on $$\frac{s1}{s0} = 2^x \text{ and } \frac{s3}{s1} = 2^{2x},$$

that the error positions are x and the check memory device ecc2, respectively, and the error values are s0 and $s1*2^x \oplus s2$, respectively;

on an assumption of a value of a check memory device ecc3 corresponding to s3 being erroneous, calculating, based on $$\frac{s1}{s0} = \frac{s2}{s1} = 2^x,$$

that the error positions are x and the check memory device ecc3, respectively, and the error values are s0 and $s2*2^x \oplus s3$, respectively;

wherein solving the error position and the error value, based on the ratio relationship between the syndrome being equal to the ratio relationship between the elements of the Vandermonde-like matrix corresponding to the syndrome, comprises:

calculating, based on $$\frac{s3}{s2} = \frac{s2}{s1} = \frac{s1}{s0} = 2^x,$$

that the error position is x, and the error value is s0.

9. The processing method according to claim 8, wherein obtaining the two roots y and y' of $y^2+y+u=0$, comprises:

solving $y^2+y+u=0$ through a mathematical operation to obtain the two roots y and y' of $y^2+y+u=0$; or obtaining the two roots y and y' of $y^2+y+u=0$ through a lookup table.

10. The processing method according to claim 9, wherein solving $y^2+y+u=0$ through the mathematical operation to obtain the two roots y and y' of $y^2+y+u=0$, comprises:

solving $y^2+y+u=0$ by performing an exclusive OR (xor) operation on u to obtain the two roots y and y' of $y^2+y+u=0$.

11. The processing method according to claim 10, wherein y and u are both 8-bit finite field numbers, wherein solving $y^2+y+u=0$ by performing the xor operation on u, comprises:

Y0=not Y0', or Y0' xor 1,

Y1=Y1',

Y2=Y2',

Y3=Y3',

Y4=Y4',

Y5=Y5',

Y6=Y6',

Y7=Y7',

Y7=U0 xor U1 xor U2 xor U4,

Y6=U0 xor U1 xor U2 xor U4 xor U7,

Y5=U1 xor U2 xor U3 xor U4 xor U6,

Y4=U0 xor U7,

Y3=U1 xor U2 xor U3 xor U4,

Y2=U0 xor U3 xor U4 xor U6,

Y1=U0 xor U2 xor U4,

Y0=U3 xor U6, and

U5=Tr(u), wherein U0 to U7 respectively indicate a 0th bit to a 7th bit of u;

Y0 to Y7 respectively indicate a 0th bit to a 7th bit of y;

Y0' to Y7' respectively indicate a 0th bit to a 7th bit of y'; and

Tr(u) indicates whether $y^2+y+u=0$ has a solution, wherein Tr(u)=1 indicates no solution, and Tr(u)=0 indicates that a solution exists.

12. The processing method according to claim 1, wherein the Vandermonde-like matrix comprises a Vandermonde matrix, a left-right flip of a Vandermonde matrix, an up-down flip of a Vandermonde matrix, or a transposition of a Vandermonde matrix.

13. An electronic apparatus, comprising:

a processor; and a memory, on which instructions are stored, wherein the instructions, when executed by the processor, cause the processor to execute the processing method according to claim 1.

14. A non-transient computer-readable storage medium, on which instructions are stored, wherein the instructions, when executed by a processor, cause the processor to execute the processing method according to claim 1.

15. A data processing apparatus, comprising:

a hardware processor, configured to:

read two sets of burst data from a first storage channel and reading two sets of burst data from a second storage channel to obtain four sets of burst data, wherein the four sets of burst data correspond to encoded data stored in the first storage channel and the second storage channel, the encoded data is obtained by encoding k data symbols that are written into the first storage channel and the second storage channel, and the encoded data comprises the k data symbols and m check symbols, wherein a total bit width of the m check symbols is eight times a bit width of one error correcting symbol; and organize the four sets of burst data into a group of error correcting codewords, wherein the group of error correcting codewords comprises k read-back data symbols and m read-back check symbols; and perform a decoding operation based on the group of error correcting codewords to obtain an error-corrected symbol, wherein encoding the k data symbols that are written into the first storage channel and the second storage channel, comprises:

encoding the k data symbols based on an encoding matrix; and performing the decoding operation based on the group of error correcting codewords to obtain the error-corrected symbol comprises:

decoding the group of error correcting codewords based on a decoding matrix to obtain syndrome; and utilizing the syndrome to obtain the error-corrected symbol, wherein:

the encoding matrix is a matrix of at least (k+m) rows and at least k columns and comprises a Vandermonde-like matrix, and the decoding matrix is a matrix of at least m rows and at least (k+m) columns and comprises the Vandermonde-like matrix, wherein the Vandermonde-like matrix is a matrix associated with a Vandermonde matrix, wherein $k \le p^n-1$, $m \le p^n$, n is a number of bits per symbol, and p is a capacity of a single bit.

16. A storage system, comprising:

the processing apparatus according to claim 15; and a storage unit.

* * * * *